US007884717B2

(12) United States Patent
Icove et al.

(10) Patent No.: US 7,884,717 B2
(45) Date of Patent: *Feb. 8, 2011

(54) PASSIVE MICROWAVE FIRE AND INTRUSION DETECTION SYSTEM

(75) Inventors: David J. Icove, Knoxville, TN (US); Carl T. Lyster, Knoxville, TN (US)

(73) Assignee: Icove & Associates, LLC, Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/759,224

(22) Filed: Apr. 13, 2010

(65) Prior Publication Data

US 2010/0214099 A1      Aug. 26, 2010

Related U.S. Application Data

(63) Continuation of application No. 11/931,399, filed on Oct. 31, 2007, now Pat. No. 7,724,134.

(60) Provisional application No. 60/944,217, filed on Jun. 15, 2007.

(51) Int. Cl.
*G08B 13/18* (2006.01)
(52) U.S. Cl. .................. 340/567; 340/521; 340/539.22; 340/584; 340/586
(58) Field of Classification Search ................. 340/567, 340/565, 541, 584, 586, 521, 539.22, 539.26, 340/539.27
See application file for complete search history.

(56) References Cited

U.S. PATENT DOCUMENTS

| | | | |
|---|---|---|---|
| 3,986,183 A | 10/1976 | Fujiwara | |
| 4,416,552 A | 11/1983 | Hessemer, Jr. et al. | |
| 4,462,022 A | 7/1984 | Stolarczyk | |
| 4,499,470 A | 2/1985 | Stacey | |
| 4,532,932 A | 8/1985 | Batty, Jr. | |

(Continued)

FOREIGN PATENT DOCUMENTS

EP        1944591        7/2008

(Continued)

OTHER PUBLICATIONS

CRAF Handbook for Radio Astronomy, European Science Foundation, 2005.

(Continued)

*Primary Examiner*—Thomas J Mullen
(74) *Attorney, Agent, or Firm*—PCT Law Group, PLLC

(57) ABSTRACT

A passive microwave receiver array, operating in the one meter to sub-millimeter wavelengths range and including an internationally protected range of frequencies of varying bandwidth, may be used for fire and intrusion detection. One or more receiver array can be used to provide a plurality of frequency ranges that can be detected. In an interior installation, one or more receiver array can be placed inside a wall. In other embodiments, the receiver and array can be in the form of a hand-held or wearable device. This method and apparatus achieves high performance by exploiting conventional low noise amplification block conversion circuits and provides the detection of thermal signals through clear, smoky, misty, or environmentally untenable conditions as well as the detection of fire and intrusion events through a non-metallic wall.

24 Claims, 18 Drawing Sheets

Integrated Fire and Intrusion Detection System

U.S. PATENT DOCUMENTS

| | | | |
|---|---|---|---|
| 4,581,606 A * | 4/1986 | Mallory | 340/539.19 |
| 4,583,869 A | 4/1986 | Chive et al. | |
| 4,605,012 A | 8/1986 | Ringeisen et al. | |
| 4,645,358 A | 2/1987 | Blume | |
| 4,715,727 A | 12/1987 | Carr | |
| 4,798,209 A | 1/1989 | Klingenbeck et al. | |
| 5,176,146 A | 1/1993 | Chive | |
| 5,302,024 A | 4/1994 | Blum | |
| 5,370,458 A | 12/1994 | Goff | |
| 5,526,676 A | 6/1996 | Solheim et al. | |
| 5,576,972 A | 11/1996 | Harrison | |
| 5,578,988 A | 11/1996 | Hoseit et al. | |
| 5,677,988 A | 10/1997 | Takami et al. | |
| 5,688,050 A | 11/1997 | Sterzer et al. | |
| 5,724,666 A | 3/1998 | Dent | |
| 5,785,426 A | 7/1998 | Woskov et al. | |
| 5,793,288 A | 8/1998 | Peterson et al. | |
| 5,796,353 A | 8/1998 | Whitehead | |
| 5,829,877 A | 11/1998 | Baath | |
| 6,188,318 B1 | 2/2001 | Katz et al. | |
| 6,384,414 B1 | 5/2002 | Fisher et al. | |
| 6,543,933 B2 | 4/2003 | Stergiopoulos et al. | |
| 6,724,467 B1 | 4/2004 | Billmers et al. | |
| 6,729,756 B2 | 5/2004 | Sezai | |
| 6,767,129 B2 | 7/2004 | Lee et al. | |
| 6,773,159 B2 | 8/2004 | Kim et al. | |
| 6,900,756 B2 | 5/2005 | Salmon | |
| 6,932,776 B2 | 8/2005 | Carr | |
| 7,052,176 B2 | 5/2006 | Stephan et al. | |
| 7,121,719 B2 | 10/2006 | Lee et al. | |
| 7,197,356 B2 | 3/2007 | Carr | |
| 2005/0248456 A1 * | 11/2005 | Britton et al. | 340/539.29 |
| 2008/0251733 A1 | 10/2008 | Anderton | |
| 2009/0284405 A1 | 11/2009 | Salmon et al. | |

FOREIGN PATENT DOCUMENTS

| | | |
|---|---|---|
| WO | 9714941 | 4/1997 |

OTHER PUBLICATIONS

Kaiser, Thomas et al.; Is Microwave Radiation Useful for Fire Detection?, 12th International Conference on Fire Detection, 2001, NIST, Gaithersburg, MD, pp. 1-16.

Ruser, H. et al., Fire Detection with a Combined Ultrasonic-Microwave Doppler Sensor, 1998 IEEE Ultrasonics Symposium, pp. 489-492.

Grosshandler, William L., NISTIR 5555, A Review of Measurements and Candidate Signatures for Early Fire Detectio, Jan. 1995.

Thuillard, M., A New Flame Detector Using the Latest Research on Flames and Fuzzy-Wavelet Algorithms, Fire Safety Journal 37, 2002, Elsevier, pp. 371-380.

Kempka, Thorsten, Microwaves in Fire Detection, Fire Safety Journal 41, 2006, Elsevier, pp. 327-333.

Luo, Ren C. et al., Fire Detection and Isolation for Intelligent Building System Using Adaptive Sensory Fusion Method, Proceedings of the 2002 IEEE International Conference on Robotics & Automation, pp. 1777-1781.

Dong, Weizhen et al., A Kalman-Tracker-Based Bayesian Detector for Radar Interference in Radio Astronomy, 2005, IEEE, pp. 657-660.

Dicke, R. H., The Measurement of Thermal Radiation at Microwave Frequencies, The Review of Scientific Instruments, vol. 17, No. 7, Jul. 1946, pp. 268-273.

* cited by examiner

PASSIVE MICROWAVE FIRE AND INTRUSION DETECTION SYSTEM

CROSS-REFERENCE

This application is a continuation of U.S. patent application Ser. No. 11/931,399, filed Oct. 31, 2007, now U.S. Pat. No. 7,724,134, which application claims priority to provisional U.S. Application Ser. No. 60/944,217 filed Jun. 15, 2007, the entire disclosures of which are hereby incorporated by reference into the present application.

TECHNICAL FIELD

Aspects described herein relate to a fire and intrusion detection system using passive microwave radio reception.

BACKGROUND

Fire and intrusion detection are important for a myriad of reasons. Fire can cause serious damage to property and persons and can even result in loss of life to persons or animals caught in a fire. Additional damage beyond that caused by flames can be caused by smoke or soot or by water used to fight the fire. Such damage can result in significant financial losses—or worse—to the victims of a fire.

Intruders, whether human or animal, also can cause damage to persons or property, and so it may be desirable to detect and locate such intruders to avoid any problems resulting from their presence. In addition, in the case of a fire, it can be very important to know whether there are any persons in a burning location and where they so that fire fighters either can locate and rescue such persons or, if no one is present, do not need to take unnecessary risks to rescue persons who are not present.

Intrusion detection typically involves the emission of electromagnetic or sound waves and detecting their reflection from the intruder. Ultrasonic intrusion systems are described in, for example, U.S. Pat. No. 3,986,183 to Fujiwara and many others. Intrusion detection systems in which a microwave frequency is transmitted and an intruder detected due to reflections of the radiated energy are described in, for example, U.S. Pat. No. 5,576,972 to Harrison; U.S. Pat. No. 5,578,988 to Hoseit et al.; U.S. Pat. No. 5,793,288 to Peterson et al.; U.S. Pat. No. 5,796,353 to Whitehead; and U.S. Pat. No. 6,188,318 to Katz et al. The systems described in these patents all require an active emission of microwave radiation from a source, which is reflected by the object (e.g., an intruder) to be detected. For example, as described in the Harrison '972 patent, known objects or living entities may provide baseline signatures against which the reflected radiation can be measured. Movement of an intruder can be detected by use of the Doppler effect, i.e., by measuring a change in the reflected radiation as an object moves towards or away from the source of the radiation.

Fire protection engineering concentrates on the detection of both flaming and smoldering fire signatures, typically through the design of heat, smoke, and optical detectors and combinations of such detectors and arrays. Flame and radiation detectors can be used to monitor for the presence of sparks, burning embers and flames. Ultraviolet and infrared detectors can also be used to detect fire by sensing electromagnetic radiation at ultraviolet and infrared frequencies. Thermal sensing differentiates a temperature of an object from that of a predetermined steady state. For example, U.S. Pat. No. 6,724,467 to Billmers et al., describes a system and method for viewing objects at a fire scene by discriminating reflections from an object from smoke and fire. Some limited tests also have utilized acoustic sensors for fire detection.

Such techniques, however, are not infallible and frequently result in false alarms. For example, a thermal sensor in the proximity of a bathroom shower may detect rising air temperature from a hot shower and trigger an unnecessary alarm. In addition, since such thermal detectors do not detect smoke, they can be slower to react and detect a fire than are smoke detectors.

Consequently, thermal sensors are often used in combination with smoke detectors which operate upon the detection of particulate matter from smoke in the air. Particle and smoke detectors use photoelectric, ionization, carbon monoxide, gas-sensing, and photo beam technologies to sense byproducts of combustion. However, these devices also are not infallible, and may falsely trigger from, for example, cigarette or cigar smoke. Moreover, one or both of the thermal and smoke detectors may be slow to react to a growing fire, thus leading to greater risk to property or life. In addition, the presence of smoke can complicate the detection of fires. Studies show that 90% of wood smoke particles are smaller than 1 micron in size. Particles from oil smoke are in the 0.03 to 1 micron range, while particles from cooking smoke from grease are in the 0.01 to 1 micron size, as is tobacco smoke. Consequently, discrimination among types of smoke is difficult, which requires sophisticated pattern recognition algorithms and detector sensors to reduce the nuisance sensitivity (see L. A. Cestari, et al., "Advanced Fire Detection Algorithms using Data from the Home Smoke Detector Project," Fire Safety Journal, 40 (2005), 1-28).

Microwave engineering technologies also have been considered as a means to detect flaming and smoldering fires, particularly when using multi-spectral electromagnetic wave sensing. The premise is that the fire's radiant heat transfer components generate a detectable signal in the microwave portion of the electromagnetic spectrum.

Electromagnetic waves are created when charged particles such as electrons change their speed or direction. These electromagnetic waves consist of an electric field and a magnetic field perpendicular to the electric field. The oscillations of these fields are reflected in the frequency and wavelength of the electromagnetic wave. The frequency is the number of waves (or cycles) per second. The energy of these waves may also be characterized in terms of the energy of photons, massless particles of energy traveling at the speed of light that may be emitted at certain discrete energy levels. The following mathematical relationship demonstrates a relationship among the wavelength of an electromagnetic wave, its frequency, and its energy:

$$\lambda = \frac{c}{f} = \frac{hc}{E}$$

where
  $\lambda$=wavelength (meters)
  c=speed of light ($3 \times 10^8$ meters per second)
  f=frequency (Hertz)
  h=Planck's constant ($6.63 \times 10^{-27}$ ergs per second)
  E=energy of the electromagnetic wave (ergs)

Wavelength and frequency are the inverse of one another as related by the speed of light, and may be used interchangeably herein in the description of embodiments and the claims as equivalents of one another. Note that the energy of an electromagnetic wave is proportional to the frequency and is inversely proportional to the wavelength. Therefore, the higher the energy of the electromagnetic wave, the higher the frequency, and the shorter the wavelength.

The spectrum of electromagnetic waves is generally divided into regions or spectra, classified as to their wavelength or, inversely, as to their frequency. These bands of wavelengths (frequencies) range from short to long wavelengths (high to low frequency) and generally consist of gamma rays, x-rays, ultraviolet, visible light, infrared, microwave, and radio waves. The term "microwave" generally is used to refer to waves having frequencies between 300 Megahertz (MHz) (wavelength=1 m) and 300 Gigahertz GHz (wavelength=1 mm). Microwave radiation is highly directional, and the higher the frequency, the more directional the emitted radiation.

The radiation from electromagnetic waves can be emitted by thermal and non-thermal means, depending upon the effect of the temperature of the object emitting the energy. Non-thermal emission of radiation in general does not depend on the emitting object's temperature. The majority of the research into non-thermal emission concerns the acceleration of charged particles, most commonly electrons, within magnetic fields, a process referred to in the astrophysics field as synchrotron emission. For example, astrophysicists and radio astronomers look for synchrotron emissions from distant stars, supernovas, and molecular clouds.

On the other hand, thermal emission of radiation from electromagnetic waves depends only upon the temperature of the object emitting the radiation. Raising the temperature of an object causes atoms and molecules to move and collide at increasing speeds, thus increasing their accelerations. The acceleration of charged particles emits electromagnetic radiation which forms peaks within the wavelength spectrum. There may be a direct correlation in changes in temperature impacting the accelerations of the composite particles of an object with the frequency of the radiation and peaks within the spectrum. Once an object reaches its equilibrium temperature, it re-radiates energy at characteristic spectrum peaks.

Common forms of this radiation include blackbody radiation, free-free emission, and spectral line emission. A blackbody is a theoretical object that completely absorbs all of the radiation falling upon it and does not reflect any of the radiation. Thus, any radiation coming from a blackbody is from its inherent radiation and is not the result of any radiation incident upon it. Blackbody radiation is a basic form of thermal emission of electromagnetic radiation from an object whose temperature is above absolute zero (0 Kelvin). Practical examples of blackbody radiators include the sun and other stars in the galaxy.

Passive high-gain directional microwave antennas and receivers have been used to measure the temperature of a remote object in the technical field commonly known as microwave radiometry. Typical users of microwave radiometry are radio astronomers scanning extraterrestrial objects and the earth. A microwave radiometer known from the field of the astronomy sciences pointed at the sky can produce a measurable voltage output which is proportional to the temperature of the target. For example, the science of detecting the temperatures of planets is an established technology in the field of radio astronomy, and radio astronomers can use microwave apparatus to measure the temperatures of distant planets and stars. Orbiting satellites pointed back towards the earth may also use microwave apparatus to conduct remote sensing of regions of the earth's surface, for example, to detect volcanic activity or to take temperature readings generally.

Radio astronomy is internationally allocated certain bands of frequencies for research purposes according to the 1979 International Telecommunication Union's World Administrative Radio Conference, also known as "WARC-79," (J. Cohen, et al., *CRAF Handbook for Astronomy, Committee on Radio Astronomy Frequencies*, European Science Foundation, 3d Ed. (2005)). These bands are free of microwave active transmission and so are relatively free of noise when used for passive detection, for example, from the stars or planets. Use of passive microwave frequencies at these internationally protected frequencies within the microwave radiation spectra may guarantee that reception is free of interference from active microwave radiation.

Some of the WARC-79 allocated bands are reserved as "PRIMARY exclusive." These PRIMARY exclusive bands include 21.850 to 21.870 MHz, providing a 20 KHz wide band; 1.400 to 1,427 GHz, providing a 27 MHz band; 2.690 to 2.700 GHz, providing a 10 MHz band, 10.680 to 10.700 GHz, providing a 20 MHz band; 15.350 to 15.400 GHz, providing a 50 MHz band; and 23.600 to 24.000 GHz, providing a 400 MHz band. In addition, some bands are labeled as "PRIMARY exclusive" but are restricted according to region of the Earth's surface.

Other frequencies also are set aside and require "Notification of Use" when someone wishes to transmit on these frequencies. These frequencies include 4.950 to 4.990 GHz, providing a 40 MHz band. The 1.6 to 1.7 GHz band is utilized for missile tracking radar but the chances of interference in a passive fire detection system would be low. Still others are "PRIMARY shared with active."

In any of these frequency bands, active microwave frequencies present in a passively received signal may be known to a passive receiver so that the active frequency can be distinguished and ignored. For example, 1.400 to 1.427 GHz provides a protected bandwidth of 27 MHz. A wider band may be received at an antenna and block converted. Alternatively, the output can be narrowed by a bandpass filler. Also, conventional low noise amplifiers may pass a band of interest and provide gain as will be further discussed herein. In addition, passive microwave reception at this frequency range may be combined with reception of microwave radiation at other microwave frequencies outside this range, and known anomalies or other noise interference can be filtered or discriminated using conventional processes from the resulting signal. Moreover, other microwave frequencies including or overlapping the internationally protected bands may be detected over wider bandwidths such as 100 MHz to several GHz.

Improved devices for microwave detection include, for example, use of metal-semiconductor field effect transistors (MESFETs) for low noise block converters. Such microwave detection devices are described in several United States Patents, including U.S. Pat. No. 7,052,176 to Stephan et al.; U.S. Pat. No. 5,302,024 to Blum; U.S. Pat. No. 5,370,458 to Goff; and U.S. Pat. No. 6,767,129 to Lee et al. Devices for microwave detection are presently less expensive when detecting radiation in a range of microwave frequencies less than 25 GHz; however, improvements in microwave detection circuitry to practical application at higher frequencies up to the infrared region should not be taken to limit embodiments described herein.

Other technical fields using detection of electromagnetic radiation in the microwave frequency range include the technical field of cellular telecommunications. Typical cellular frequencies include 800 MHz and 1.8 GHz. intermediate frequency may be at 70 or 140 MHz. In the cellular telecommunications field, it is conventional to provide an antenna pole or mount on a building or other fixed structure having some height. For example, FIG. 8 of U.S. Pat. No. 5,724,666 to Dent shows a plurality of antenna arrays 210, 212, each having respective amplifiers 216, wherein each array appears as a plurality of directional elements 224 which may be used for transmitting and receiving.

The use of passive microwave detection in the field of radio astronomy is described in several U.S. Patents, including U.S. Pat. No. 4,499,470 to Stacey; U.S. Pat. No. 4,645,358 to Blume; U.S. Pat. No. 5,526,676 to Solheim et al.; and U.S. Pat. No. 6,729,756 to Sezai. The '470 patent to Stacey describes a satellite over the oceans of the Earth, their mapping as the satellite passes between land and water and monitoring of the temperature of the ocean below. The '358 patent to Blume describes a problem in the radio astronomy field that measurement of the Earth's surface properties and those of the universe can be very inaccurate, especially in cases of low contrast with the background and describes a Raleigh-Jeans approximation procedure for overcoming such problems. The '676 patent to Solheim et al. describes principles of microwave radiometry especially applicable to detection of water vapor and cloud masses using frequencies, for example, at 50-70 GHz, 19-29 GHz and 40-80 GHz. The '756 patent to Sezai discusses use of a deep space reference temperature of 2.7° Kelvin as well as a hot calibration source.

The principles of radio astronomy also have been applied to measuring energy inside a human body. Such use can be seen in, for example, U.S. Pat. No. 4,416,552 to Hessemer, Jr. et al; U.S. Pat. No. 4,532,932 to Batty, Jr. (tumor cells); U.S. Pat. No. 4,583,869 to Chive et al. (use of two probes); U.S. Pat. No. 4,605,012 to Ringeisen et al. (hyperthermia); U.S. Pat. No. 5,677,988 to Takami et al. (internal temperature of human body); U.S. Pat. Nos. 4,715,727 and 6,932,776 to Carr (heating at 915 MHz and measuring at 4.7 GHz); U.S. Pat. No. 4,798,209 to Klingenbeck et al. (diseased human tissue); U.S. Pat. No. 5,176,146 to Chive and U.S. Pat. No. 5,688,050 to Sterzer et al. (mammography); U.S. Pat. No. 6,543,933 to Stergiopoulos et al. (the skull); and U.S. Pat. No. 6,773,159 to Kim et al., U.S. Pat. No. 7,121,719 to Lee et al. and U.S. Pat. No. 7,197,356 to Carr (microwave catheter).

Microwave engineering technologies have also been investigated for use in detecting flaming and smoldering fires. In research by the inventors, fire has been demonstrated to actually be "plasma," a phenomenon often referred to as the fourth state of matter. Plasma is an ionized gas that consists of a mixture of electrons (negatively charged particles) and ions (atoms that have lost electrons, resulting in a positive electric charge). Fire can be easily classified as plasma, because it often behaves like a gas, can conduct electricity, and is affected by magnetic fields. Common examples of a plasma fires range from the Sun to the arc formed during electric arc welding, both of which can offer a broad electromagnetic spectrum of radio interference.

Detection of fires by microwave engineering techniques relies upon the fact that thermal radiation from fires generates a detectable signal in the microwave portion of the electromagnetic spectrum which, like the microwave radiometer, can create a measurable change in voltage output which is proportional to a temperature.

For example, one use of microwave technologies in the field of fire detection appears in a 1995 National Institute of Standards and Technology (NIST) report by Grosshandler entitled, "A Review of Measurements and Candidate Signatures for Early Fire Detection," NISTIR 5555, January, 1995 at pp. 13-14. The NIST report suggests that the concept of multi-spectral electromagnetic wave sensing may be applicable to fire detection. The report cites a "modified microwave motion detector . . . for monitoring the presence of a flame within a multi-burner natural gas furnace," citing Berman et al. (1992). (C. H. Bermann et al., "Microwave Backscattering Fuel/Air Ratio Control and Flame Monitoring Device," *Fossil Fuel Consumption*, American Society of Mechanical Engineers, Vol. 39, Book G00645, 1992). According to U.S. Pat. No. 5,785,426 to Woskov et al., a waveguide may be disposed within a furnace to direct radiation through a window to a heterodyne receiver disposed outside the furnace; this radiation can be used to measure furnace temperatures where the microwave radiation is in the range of 130-140 GHz and converted to 0.4-1.5 GHz for detection. U.S. Pat. No. 5,829,877 to Baath describes utilizing microwave energy and, as shown in FIG. 5 of Baath, describes detecting certain relevant peaks, for example, $SO_2$, $NO_2$, $H_2O$, and $NH_3$, among other compounds known as products of combustion.

A German 2001 NIST paper suggests that Daimler Chrysler Aerospace AG conducted earlier experiments in fire detection using microwave energy (T. Kaiser et al., "Is Microwave Radiation Useful for Fire Detection?" *Proceedings of the 12$^{th}$ International Conference on Automatic Fire Detection*, AUBE '01, Volume 965, Mar. 26-28, 2001, Gaithersburg, Md., NIST Special Publication). The purpose of these experiments, which is not further explained, was to detect fires in garbage bunkers. The possibility of using microwave engineering technologies in passive fire detection is also described in the NIST Conference paper in 2001 by Kaiser et al. which further describes the use of microwaves to passively detect a fire using a conventional Dicke switch operated at 1 KHz to compare a reference temperature of a room wall with measurements at 11 GHz in the microwave region and a bandwidth of 1 GHz. (See R. H. Dicke, "The measurement of thermal radiation at microwave frequencies," *Rev. Scl. Instr.* Vol. 17, pp. 268-275, 1946). The discussed technique relies upon thermal radiation from fires generating a detectable signal in the microwave portion of the electromagnetic spectrum. To do so, Kaiser et al. further suggest use of a commercial satellite dish and a superheterodyne low noise converter to measure the microwave radiation of a target test fire.

Follow-up tests are described by Kempka et al. in 2006, and expand the frequency range of the initial Kaiser et al. experiments from 2 to 40 GHz (T. Kempka et al., "Microwaves in Fire Detection," *Fire Safety Journal*, Volume 41, 2006, pp. 327-333). According to this 2006 publication, thermal radiation may be measurable utilizing four broadband antennas to cover four separate frequency bands of operation, i.e., 2-12, 12-18, 18-26, and 26-40 GHz bands of operation and respective bandwidths at 100 MHz each. "For each configuration one sample will be measured in the first frequency band. Then the receiver changes to the next frequency band and takes another sample. After all the selected frequency bands are measured, the receiver will measure the first band again." Kaiser et al. further suggest using a "hot load" having a temperature of 100° C. (373 K) to calibrate their apparatus at a reference temperature. Certain fires were detected 90 seconds after ignition while another type of fire was detected 80 seconds after a heater was switched on. The time difference between samples was about 3.5 seconds.

Significant tests conducted by the inventors have expanded the initial reported results, have demonstrated methods to reduce interference by use of selected frequencies and isolation of spurious electromagnetic noise, and have introduced new concepts beyond fire detection to intrusion and security alerting. The inventors have presented and published their research findings based on these and other tests at the 2007 Interflam international engineering meeting and symposium (D. J. Icove and C. Lyster, "Microwave Fire Detection: A Survey and Assessment," Interflam2007, University of London).

There are a broad range of examples that demonstrate a long-felt need where microwave fire and intrusion technologies can play an important role, particularly when such a system is fully automated.

For example, in broad surveillance to guard against forest fires, many of which can quickly burn valuable timber and threaten human life, microwave early detection technology would be of extreme benefit. Due to the geometric growth of uncontained forest fires, proactive early detection is highly desired so that a fire can be rapidly and aggressively extinguished before it becomes uncontrollable.

The military also could use microwave fire and intrusion technologies in their support and security efforts, for example, to monitor and protect battlefields, bridges, harbors, international crossing points, and other critical infrastructures. Another benefit of these technologies is that it can passively detect aircraft coming over the horizon at any altitude.

In addition, domestic farming activities could benefit from microwave fire and intrusion detection. Since the technique is also sensitive to body temperatures within the field of view of the receiving antennae, the tracking and corralling of livestock such as cattle over ranges, entering corrals, and even wandering outside boundaries could be beneficial, particularly for those in the milking industry. This technology could also determine thermal signatures of livestock, humans, or predators so that such animals can be monitored and undesired intruders identified.

Microwave fire and intrusion detection capabilities can also be used to detect the movement of vehicles along roads and tunnels and shipboard movements along channels. Signature analysis could identify the traffic flow and thermal signatures differentiating between cars, trucks, motorcycles, aid other vessels. This technique could also identify stalled vehicles or those catching fire particularly in high density underground tunnels.

These and other uses can be made of a microwave fire and intrusion detection method and apparatus in accordance with aspects and features discussed below.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter.

Embodiments of a low-cost passive microwave receiver and associated arrays in accordance with aspects and features described herein can permit the efficient monitoring, detection, and reporting of fire and sources of other thermal signatures introduced within a surveillance area or field of view. In other embodiments, a passive microwave receiver can be used to recognize human or other animals present in an area, and thus can be used, for example, as an intrusion detection device. An associated fire or intrusion detection method such as is described herein is passive in nature, and potentially harmful-to-human and noisy microwave radiation emission may be limited, with no damage to structures or living organisms as may occur from an active microwave radiation system and method.

A passive microwave radiation receiver in accordance with aspects described herein may comprise a fixed array of antennas and low noise receivers mounted in a surveillance grid for an enclosed space or an open area. The fixed array of receivers may comprise directional antennae operating at fixed frequencies over a bandwidth of frequencies, for example, a bandwidth that is protected internationally for passive microwave reception. In another embodiment, a passive microwave fire or intrusion detection apparatus may comprise a unit which may be worn or carried by a person. A passive microwave fire and intrusion detection method and system may achieve a high performance including a low level of false alarms by recognizing known anomalies and exploiting the natural detection of thermal signals through clear, smoky, or misty conditions. Moreover, embodiments using improved passive radiometer circuits and processes can improve the detection of fire to a matter of seconds from ignition.

Various embodiments in accordance with aspects described herein can provide a wide range of fire and security applications, including but not limited to fire detection, proximity and intrusion detection, surveillance, infrastructure protection, and security investigations. For example, low-cost, hand-held microwave detectors may be useful for fire investigators conducting on-scene assessments of post-fire smoldering debris. Passive microwave detectors in accordance with one or more aspects herein could also assist fire investigators to identify and confirm multiple sources of ignition during full-scale fire tests, particularly during the generation of optically dense smoke and flames. The intrusion detection aspects herein can also assist fire investigators and first responders to identify and locate the presence of persons or other living beings needing rescue in a fire. In addition, the intrusion detection aspects herein can be used for general security and monitoring purposes as well.

DETAILED DESCRIPTION

Figure 1:
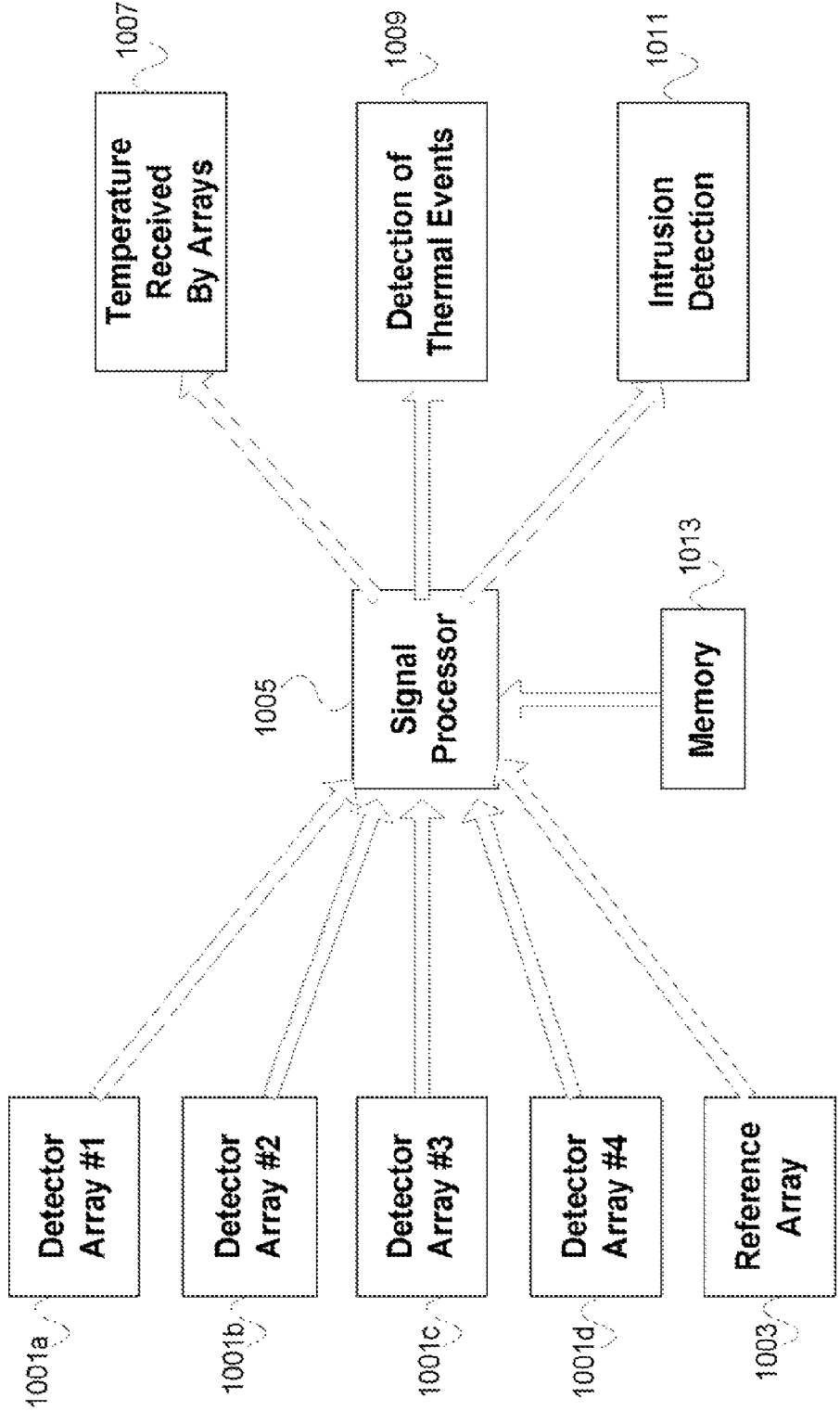
FIG. 1 is a block diagram of an integrated passive fire and intrusion detection system according to one or more aspects described herein.

The aspects summarized above can be embodied in various forms. The following description shows, by way of illustration, combinations and configurations in which the described aspects can be practiced. It is understood that the described aspects and/or embodiments are merely examples. It is also understood that one skilled in the art may utilize other aspects and/or embodiments or make structural and functional modifications without departing from the scope of the present disclosure.

As described above, it is known that fire, including non-flaming fires such as smoldering embers, emits a wide spectrum of electromagnetic radiation. Such radiation includes not only infrared (heat) radiation, but also includes microwave radiation in the range of 300 MHz to 300 GHz and at corresponding wavelengths of from 1 meter to less than 1 mm, due to the energy radiated by such fires. Such microwave radiation can be detected without the need for any corresponding emission of microwave radiation by an antenna. Instead, in accordance with aspects and features described herein, the emitted energy of a fire in the microwave regions of the electromagnetic spectrum can be detected using passive microwave detection by one or more antennae.

In addition, living bodies such as persons or animals also emit microwave radiation due to their inherent thermal energy. This radiation also can be detected by the same antenna used to detect the microwave radiation from a fire.

Thus, a passive microwave detection method in accordance with aspects described herein can rely upon tire fact that thermal radiation from fires, persons, or other bodies can generate a detectable signal in the microwave portion of the electromagnetic spectrum.

Embodiments described herein can use characteristics of microwave radiation at various frequencies in a method and system for fire and intrusion detection. Because of the high frequency/short wavelength nature of microwaves, microwave radiation can penetrate optically thick smoke and water vapor, as molecules suspended in the air such as oxygen, water vapor, dust, and smoke do not attenuate the microwave radiation emanating from an object, whether the source of the radiation is a thermal incident such as a fire or an intruder or other object.

Microwave detectors thus could assist fire fighters to identify and confirm multiple sources of ignition, particularly in fires involving the generation of optically dense smoke. Using well-known principles regarding directionally diverse antennae, a microwave detection system in accordance with aspects herein can permit a fire or an intruder (or fire victim) to be more quickly located and pinpointed. In addition, if radiation is emitted in certain pre-determined spectra, silicon dioxide or nitrogen dioxide, ammonia, water, carbon monoxide or other detection spectra may be identified, especially if present, in substantial quantity, so that fire fighters can be aware of the presence of such materials and direct their efforts accordingly.

In addition, due to its relatively long wavelength, microwave radiation can penetrate non-metallic walls, and can thus be used to detect a fire or an intruder within such a non-metallic structure.

FIG. 1 is a block diagram of an exemplary microwave fire and intrusion detection system according to one or more aspects described in more detail herein. As shown in FIG. 1, a microwave fire and intrusion detection system can include a plurality of detector arrays, such as detector arrays 1001*a* through 1001*d* in the exemplary embodiment shown in FIG. 1, plus reference array 1003. As discussed in more detail herein, detector arrays 1001*a*-1001*d* are configured to detect radiation in one or more frequency bands in the microwave range, such as radiation emanating from a fire or an intruder, while reference array 1003 is configured to detect radiation from a baseline radiation source such as the ground. Each detector in array 1001*a*-1001*d* can detect a unique temperature reading 1007 based on the received microwave radiation, where each detector operates at a different wavelength or frequency. Each array can report this unique temperature reading 1007 in the form of a voltage signal that is in turn output to a central processing unit comprising a signal processor 1005 and memory 1013 as shown in FIG. 1 (described in more detail below with respect to FIGS. 7 and 8). The voltage reported by each detector to signal processor 1005 can be directly or indirectly proportional to the temperature measured by the detector. In an alternative embodiment, active microwave signals may be detected, stored in memory 1013 as a signature, and subtracted as noise from any signals processed by signal processor 1005.

Signal processor 1005 can be in the same or a different location as the antenna arrays, and the signals from each array to signal processor 1005 can be transmitted by wired or wireless means. If by wireless transmission, each such wirelessly transmitted signal can include a data signal uniquely indicative of the location and frequency range and bandwidth detected so that the signal can be appropriately identified. For example, signal processor 1005 can be at a remote location such as a fire station or other central monitoring station not affected by inclement environmental conditions such as those that may be present at a fire site, fire testing facility, battlefield, hazardous waste dump, or other site.

Once the signals from detector arrays 1001a-1001d and reference array 1003 are processed, the results can be provided in a number of ways. According to aspects described herein and as discussed below the received microwave radiation can be converted into a signal wherein a voltage can be determined as a result of the differences in radiation detected. In some embodiments, the radiation detected is compared to baseline radiation from, for example, a floor of a room, the ground, or the foliage of large trees, and a voltage difference can be used to detect the presence of a fire or an intruder. For example, a positive voltage is indicative of a fire or high temperature while a negative voltage may indicate the presence of a human body intruder. In other embodiments, the baseline radiation can be from a fire itself, and detected radiation can be used to determine the presence or absence of a human or other living being in a burning space, thus aiding first responders in identifying the presence—or just as importantly, the absence—of persons in need of rescue.

In some embodiments, the difference in microwave frequencies detected by detector arrays 1001a-1001d and reference array 1003 can be output as a temperature detected by the detector arrays, either as an absolute temperature or as a temperature difference so that a flaming fire or other thermal event 1009, such as a smoldering fire in the pre-flaming stage, can be detected. In addition, as described above, in some circumstances, the constituents of the fire can also be detected so that fire fighters can know from the outset what may be burning and can plan for fighting the fire accordingly. Alternatively, the difference in detected frequencies can be output as a detection of an intruder 1011, and an appropriate alarm can be sounded.

In other embodiments, the central processor can be connected to a display so that a visual display of a fire configuration can be shown, either alone or, for example, combined with a display of the burning building retrieved from memory 1013. Such a display can show the location of actively burning fires and non-flaming hot spots. In addition, the intrusion detection aspects of such system can show the location of any persons or animals within a building, thus enabling fire fighters or other first responders to better focus their efforts to fighting the fire and saving the lives of fire victims without risking theirs in unnecessary rescue attempts.

These and other aspects will be discussed in more detail below.

As noted above and as described in more detail herein, aspects of a passive fire and intrusion detection method and apparatus can incorporate the use of one or more passive microwave-based sensors including one or more antennas configured to receive microwave radiation in the microwave frequency range, including any of the several frequency ranges described above that are protected for passive microwave detection in the field of radio astronomy with detection occurring over the protected band.

In accordance with one or more aspects described herein, a passive microwave fire and intrusion detection system and method can utilize the detection of microwave radiation on one or more of these protected frequencies by various combinations of microwave receivers and antenna arrays. An antenna array in accordance with one or more aspects herein can be designed to detect a subset of the microwave radiation band of from, for example, a 27 MHz-wide band of 1.400 to 1.427 GHz and a 20 MHz wide band at a center frequency of 10.690 GHz. In addition, in accordance with aspects herein, this bandwidth can be split into many different internationally protected bands of varying bandwidth according to WARC-79 radio astronomy allocations, with each of a plurality of receivers receiving a subset of the emitted microwave radiation. As other bands may be reserved in the future for passive detection, such frequencies and bands may also come within the scope of an embodiment. In addition, other bands in the microwave regions may be utilized, including bands which overlap internationally protected bands and known microwave radio frequencies in a given area subtracted or filtered from results.

Due to the mass production of commercial microwave antennas and associated electronics, the cost of passive microwave fire and intrusion detection is relatively low when compared to other technologies, such as infra-red thermal imaging. Low noise amplifier circuitry is now conventional and provides excellent low noise performance and permits discrimination from noise using antennae that are not high gain or large in size such as parabolic or horn antennae.

Antenna arrays in accordance with aspects herein can include flat arrays, parabolic arrays or horn type arrays and can include one or more point antenna as well as directional cellular telecommunication pole antenna arrays of antenna elements. For example, in experiments by the inventors and as seen in FIGS. 9-12 and 14, a parabolic dish antenna having a diameter of approximately 19 inches was used. The antennas used by the microwave receiver can be of any configuration, however, including fixed, rotational, or steerable antennas, and can be designed in accordance with the bandwidth to be detected, for example, if steerable antennas are used, such antennas can be either mechanically or electronically steered to detect directional beams. Other antenna arrays could include wide or narrow beamed configurations or lobes, depending upon the specific design of the individual application, field of view, and property to be protected. In addition, in some embodiments as described below, one or more antenna for passively detecting microwave radiation from a fire or an intruder can be incorporated into a hand-held device that can be carried, for example, by a firefighter, or into a device that can be worn, for example, as part of a firefighter's helmet or other protective gear.

Figure 6:
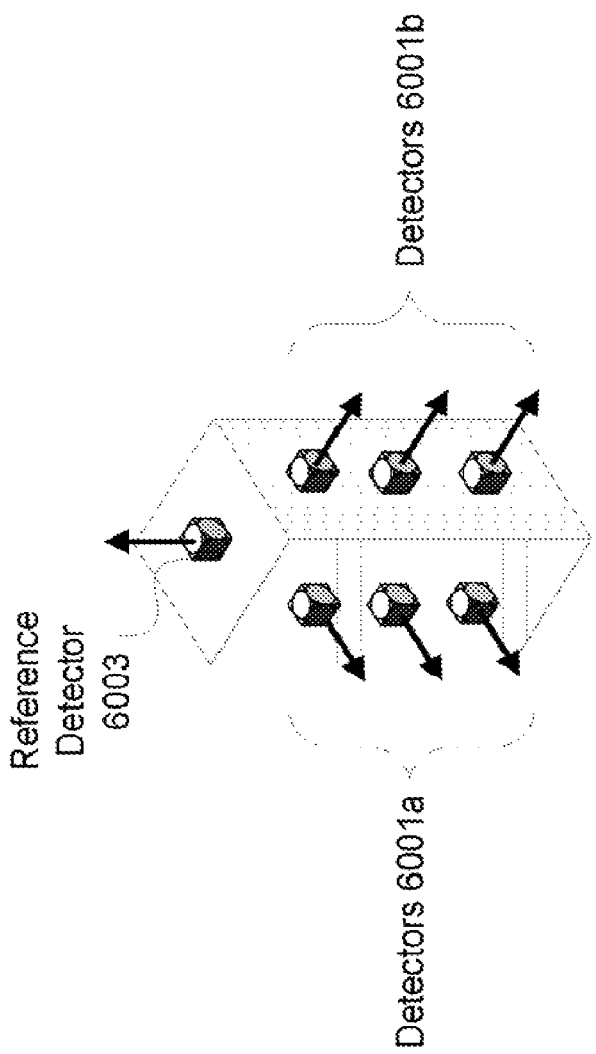
FIG. 6 depicts an exemplary embodiment of a multi-sided apparatus containing multiple microwave receiver and antenna arrays in accordance with one or more aspects described herein.
Figure 7:
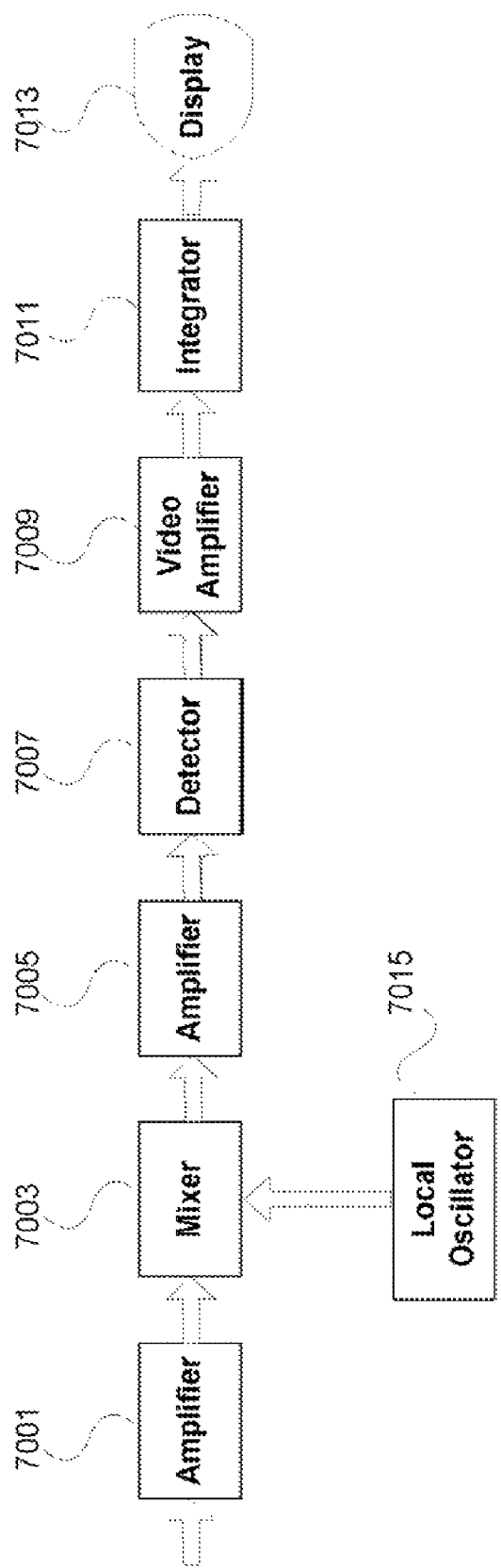
FIG. 7 depicts an exemplary embodiment of a superheterodyne receiver with signal display that can be used with a passive fire and intrusion detection system according to one or more aspects described herein.

An exemplary antenna array may be similar to that depicted in FIGS. 6 and 7 of U.S. Pat. No. 5,563,610 to Reudink. Such an array may receive microwave frequencies via a first element provided with a low noise amplifier circuit such as, for example, a model RAS-1420 LNA providing 28 dB of gain in the 1.400 to 1.427 GHz 27 MHz pass band of interest, available from www.radioastronomysupplies.com. A second or the same antenna element of the same array may receive microwave frequencies in the 1.200-1.700 GHz band including the 1.400 to 1.427 GHz band of interest of passive frequencies, for example via a ZHL-1217HLN circuit having 30 dB of gain available from www.minicircuits.com. A third low noise amplifier choice can be an amplifier such as a ZGL-2700 MLNW, providing 25 dB of gain in the 2.2 to 2.7 GHz band including a 2.690 to 2.700 GHz providing a 10 MHz band of interest. This third LNA may have its own antenna element or share an antenna element of the same array. When overlapping bands with passive bands are captured, any active frequencies may be filtered out using band stop filters so that only the desired passive frequencies are analyzed by the signal processor or, vice versa, a filter may be designed to pass the band of interest.

In accordance with aspects herein, for any antenna array or antenna configuration, it can be desirable to calibrate an antenna using a reference target having a known temperature to provide a baseline reference temperature and a reference received energy level. One such method for calibration can involve using a Dicke switch method to compare the detected radiation with a known temperature source. Typical frequencies of operating a Dicke switch may be from 1 Hz to 10 KHz, with a conventional range being from 100 Hz to 1 KHz. A reference temperature can be provided by using a "hot load," for example, an object having a temperature of 100° C., and the microwave radiation emanating from that object can be measured to use as a baseline reference.

Other reference temperatures can be used depending on the configuration and application of the antennae. Various calibration sources for temperature already exist in the environment, both inside and outside and naturally vary depending on the time of day and weather. For antennae that are worn or hand-held, the human body (skull or chest cavity) may provide an appropriate reference temperature. In indoor installations, the wall or floor may be used as a suitable reference source. In an outdoor installation, the ground can be used as a source of baseline reference energy because of its predictable temperature variance in view of time of day and weather conditions. Other outside references for temperature, for example, could include the temperature of the sun, the earth, or foliage of large trees may be used to establish a reference temperature and a reference received energy level for the surrounding environment. In addition, a calibration routine conducted over a period of time in a fixed system may record known objects such as vehicles or aircraft and the presence and intrusion of pet animals and other living organisms expected to be present.

FIGS. 2-6 depict various exemplary embodiments of arrangements of antenna arrays that can be used in a passive microwave fire and intrusion detection system and method in accordance with one or more aspects described herein. It should be noted that the configurations shown in FIGS. 2-6 are exemplary only, and that other configurations and uses of passive microwave antenna arrays can be made within the scope of the present disclosure. The antennas may be close to or far away from the target source of the radiation, whether it is a fire or an intruder. For example, in some embodiments, the antennas can be located as close as 2.5 meters and as far as 100 meters from the target, although, as discussed below, the target may be much farther away, since using the methods and apparatus described herein, an airplane can be detected at thousands of meters distance.

Figure 2:
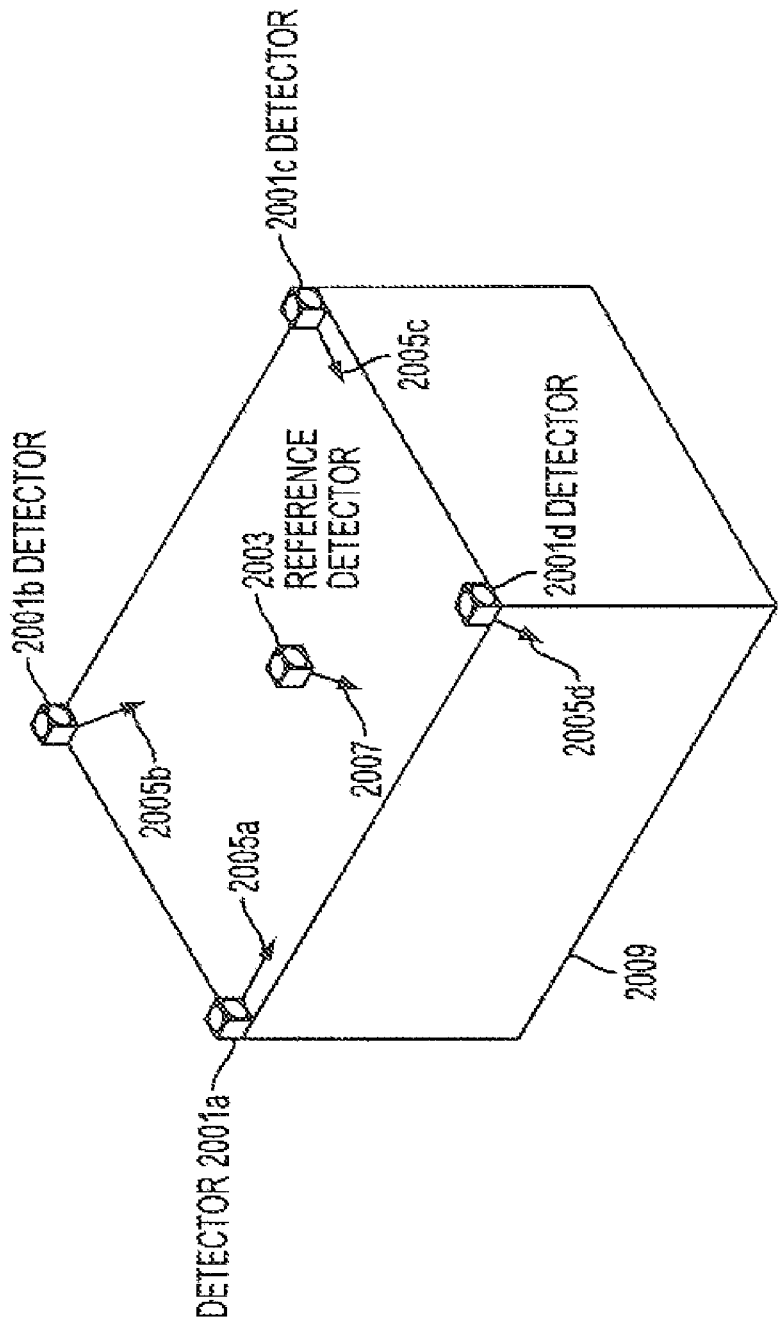
FIG. 2 is an exemplary array of microwave receivers and antennas placed in an enclosed space in accordance with one or more aspects described herein.

FIG. 2 depicts an exemplary array of antennas that can be used in an interior installation, for example, to protect an enclosed space. Spaces that can be protected by such a configuration include commercial and residential buildings, offices, warehouses, and other structures.

As shown in FIG. 2, a plurality of detector antenna arrays 2001a-2001d can be placed at spaced-apart locations around a perimeter of an enclosure 2009. In an exemplary embodiment, each detector antenna array can be in the form of a cellular radio type pole array similar to those depicted in FIGS. 6 and 7 of U.S. Pat. No. 5,563,610 to Reudink. In one configuration, detector antenna arrays 2001 can be placed outside the walls, i.e., so that they can be seen by persons within the room. Alternatively, as noted above, microwave radiation can penetrate walls, and therefore one or more of the detector antennas also can be placed within the walls. Placing the antennas within the walls can be aesthetically desirable, but more significantly, can be advantageous in that an intrusion detection system with detectors placed within the walls of an enclosure cannot be seen or tampered with by an intruder, thus providing additional protection.

Also as shown in FIG. 2, the plurality of detector antennas 2001a-2001d can be arranged to detect radiation from different directions 2005a-2005d. Each antenna array 2001a-2001d may have a primary directional lobe covering from a wall which it faces to a center of the room. Two corners of a room may provide sufficient directionality to determine the precise location of a fire or intruder. In addition, as discussed above, one of the antenna arrays may be configured to receive microwave radiation at one frequency band, for example, the 1.400 to 1.427 GHz 27 MHz pass band of interest, while, another of the arrays can be configured to receive microwave frequencies in the 1.200-1.700 GHz band including the 1.400 to 1.427 GHz band of interest. Reference detector 2003 can be configured to detect radiation from a baseline reference source such as a wall or the floor. The radiation detected at detector antennas 2001a-2001d can be compared with the baseline radiation detected by reference detector 2003 from direction 2007 and processed as discussed in more detail herein to provide detection of a fire or intruder within the enclosure 2009.

Figure 3:
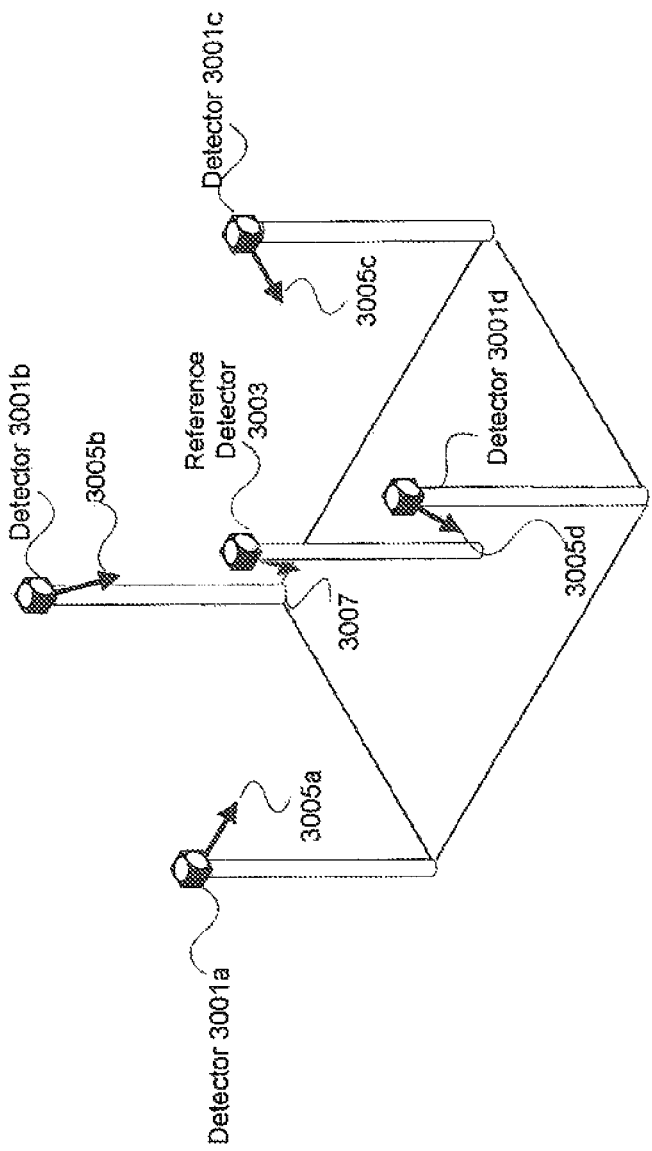
FIG. 3 is a block diagram of an exemplary array of microwave receivers and antennas placed in an out-of-doors space in accordance with one or more aspects described herein.

Another exemplary configuration of detector antenna arrays is shown in FIG. 3. As shown in FIG. 3, a plurality of detector antenna arrays 3001a-3001d can be placed in spaced-apart locations around a perimeter of an out-of-doors space to be monitored such as a parking lot, hazardous waste dump, or storage facility. As with the detector antenna arrays described above with respect to FIG. 2, the plurality of detector antennas 3001a-3001d can be arranged to detect microwave radiation from different directions 3005a-3005d, at different microwave frequencies, or both. In addition, as with the indoor configuration described above with respect to FIG. 2, reference detector 3003 can be configured to detect microwave radiation from a baseline reference source from direction 3007 such as the ground, the sun, or foliage of large trees. The microwave radiation detected by detector antennas 3001a-3001d can be compared with this baseline radiation to provide detection of a fire or intruder within the perimeter defined by the antenna installation.

Figure 4:
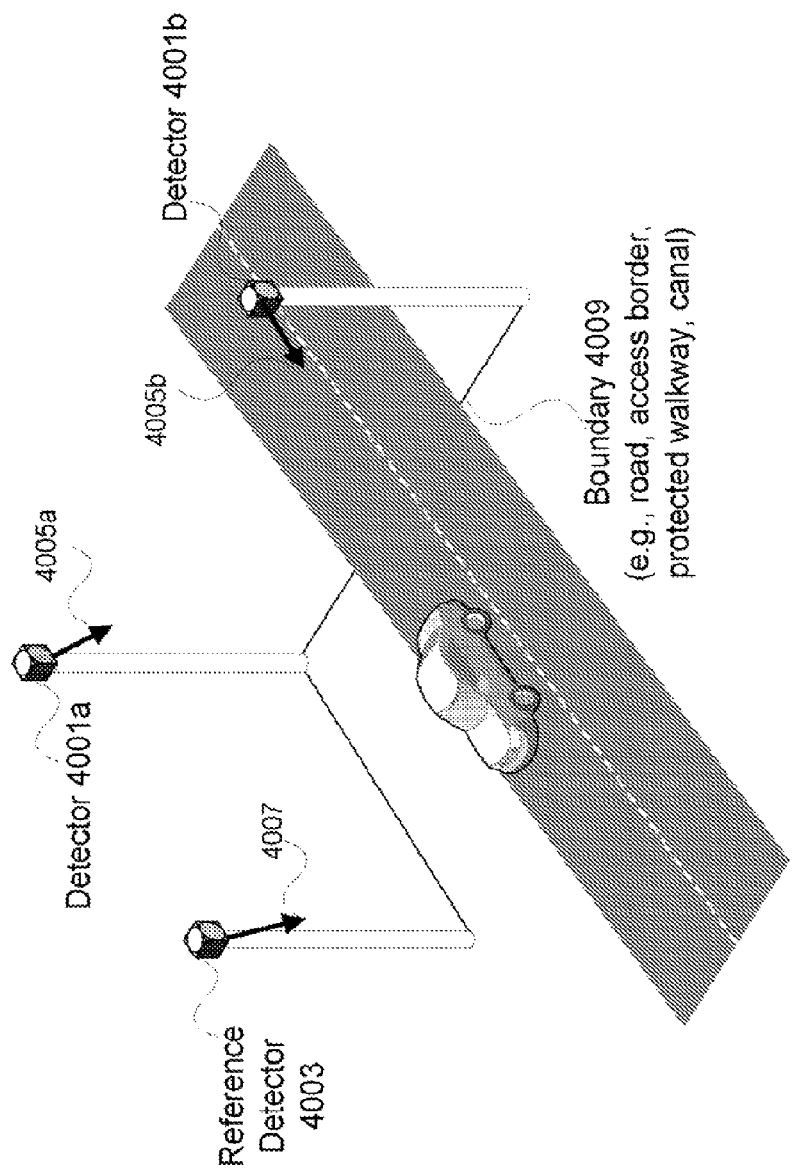
FIG. 4 is a block diagram of an exemplary array of microwave receivers and antennas placed near a boundary to be protected in accordance with one or more aspects described herein.

FIG. 4 depicts an exemplary configuration of detector antenna arrays along a boundary 4009 such as a road, border, walkway, canal, etc. In this embodiment, microwave detection in accordance with aspects herein can be particularly useful for intrusion detection, since the presence of a body crossing the boundary can be almost instantaneously detected by the use of microwave detection. As shown in FIG. 4, two or more detector antenna arrays such as arrays 4001a and 4001b can be placed at spaced apart locations around the boundary to be protected, for example, at opposite ends of a line demarcating the boundary. As with the detector arrays described above, detector arrays 4001a and 4001b can be configured to detect microwave radiation from directions 4005a and 4005b, at different microwave frequencies, or both. The microwave radiation so detected can be compared to baseline radiation detected by reference detector 4003 in direction 4007 to provide immediate indication of the presence of an intruder at the boundary.

Figures 5A, 5B:
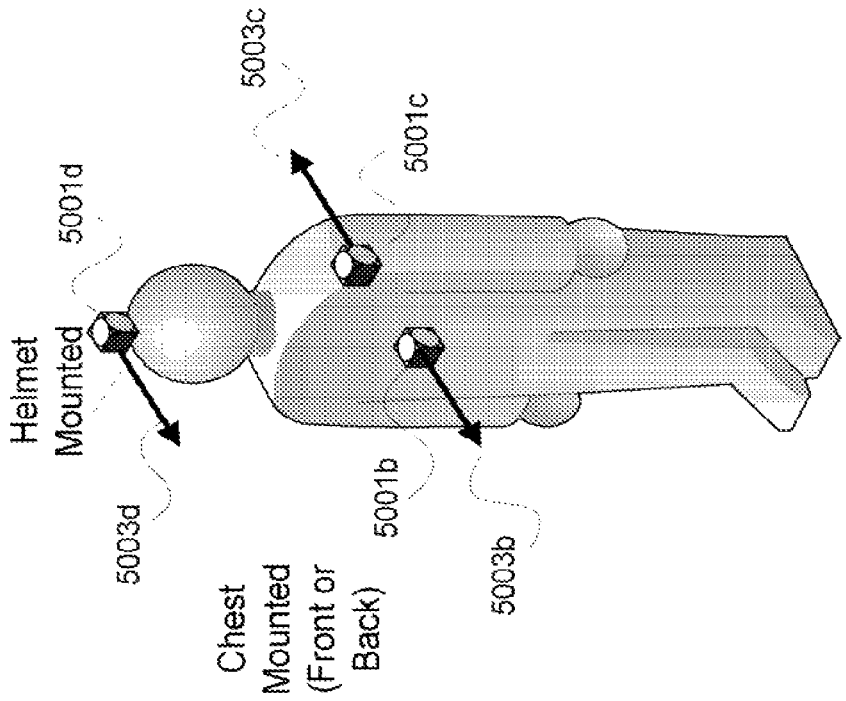
FIG. 5A depicts an exemplary embodiment of a wearable apparatus containing a microwave receiver and antenna array in accordance with one or more aspects described herein.
FIG. 5B depicts an exemplary embodiment of a handheld apparatus containing a microwave receiver and antenna array in accordance with one or more aspects described herein.

In an embodiment as shown in FIG. 5A, a passive microwave fire detector 5001a having a directionality 5003a can be incorporated into a device that can be held by a user to detect microwave radiation emanating from a fire or other thermal event such as a non-flaming hot spot. In an embodiment such as is shown in FIG. 5B, one or more passive microwave fire detectors 5001b-5001d, either alone or combined with conventional smoke, temperature, or fire detectors, can be incorporated into devices that can be worn by fire fighting or investigative personnel, such as on the front 5001b or back 5001c of a protective overcoat or mounted on a helmet 5001d. These antennas can have respective directionalities 5003b-5003d to enable the wearer thereof to detect microwave radiation in several different directions at once. In some embodiments, a conventional pressure pinhole camera may be added to the helmet and provide a visual display through smoke. In some embodiments, a microwave radiation detection device in accordance with aspects described herein can include an antenna proximate to the body to provide a stable reference temperature against which to measure the thermal radiation of a fire. In some other embodiments, a global positioning system (GPS) apparatus can be incorporated into a first responder's protective gear, and can be used to provide a guide regarding a building plan or layout, for example by using a map stored in central processing unit memory 8007 shown in FIG. 8. For example, a helmet may be provided with a display for wireless data transmitted from signal processor 1005 and thus, for example, a first responder may be guided to door openings and go directly to a detected fire victim that the first responder would not otherwise see but for microwave detection apparatus in accordance with aspects described herein.

Such wearable or hand-held microwave fire detectors can also enable such first responders to detect the presence of non-flaming "hot spots" to ensure that a fire is fully extinguished, or can identify the presence—or absence—of persons or other living beings in a space before entrance so that fire fighters do not have to go into dangerous situations to rescue persons who are in fact not there. In addition, a microwave detector worn on a helmet of a first responder can serve as an early predictor of increasing threats of fire development and spread. These conditions occur when increasing levels of thermal heat transfer from the fire build up near the ceiling of the room causing items beneath to ignite. During extremely high thermal radiation to the floor level (approximately 20 kW per square meter), the simultaneous ignition of these items results in a condition also known as "flashover." A predictive early warning of these increasing hazardous conditions could enable first responders and fire fighters to evacuate both themselves and other building occupants to a safer location before such fire event occurs. This embodiment also can be very useful for fire investigators who conduct on-scene assessments of post-fire smoldering debris to assist them in locating additional areas for investigation at the scene or for fire investigators when identifying and confirming multiple sources of ignition during full-scale fire tests, particularly during the generation of optically dense smoke. In addition, it may be possible to identify the nature of the burning material based on its microwave "signature" and thus such a detector when worn by a first responder can assist him or her in identifying the nature of the fire and in formulating an appropriate plan for fighting it.

Components for use by such fire investigators may be designed to include electronic components operable without distortion at high temperatures such as 200° Fahrenheit (93° C.).

FIG. 6 depicts an exemplary embodiment of a multi-sided fire and intrusion detection apparatus comprising a detector array having a plurality of sets of microwave receivers and antennas 6001a, 6001b . . . 6001n, where n is the number of sides in the apparatus. The microwave radiation detected by these receivers is compared to the radiation detected by reference detector 6003 which can be placed at a top side of the apparatus as shown in FIG. 6. This embodiment of a microwave fire and intrusion detection apparatus can be in either a stationary or portable configuration and can be used to provide fire and intrusion detection in locations such as along fence lines or highways; in parking lots, hazardous waste dumps, chemical sites, or shipyards; or in fire towers on mountains or hilltops. Because microwave radiation travels through the air and therefore can be detected by an apparatus such as illustrated in FIG. 6 placed atop a fire tower at an elevated location, potentially catastrophic wildfires can be quickly detected and treated before they become a danger to livestock, human life, or property.

The output of the antenna arrays in a microwave fire and intrusion detection system, whether in any of the configurations discussed above or otherwise, can be fed to a superheterodyne receiver shown in FIG. 7. As shown in FIG. 7, a superheterodyne receiver with a signal amplifier can comprise an amplifier 7001, for example, a conventional low noise block amplifier or low noise amplifier possibly requiring a bandpass filter having superior noise performance, a mixer 7003, and a local oscillator 7015 for demodulating the received signal to an intermediate frequency (IF) signal, for example, in the 100 MHz to 1.5 GHz range. The IF signal may then be amplified at amplifier 7005 and transmitted by wired or wireless means to a signal processor 1005 at a central site as shown in FIG. 1 for further processing.

The signal processor 1005 shown in FIG. 1 at a central site may comprise elements 7007-7013 shown in FIG. 7. At the central site, the received IF signal may be detected as a voltage at detector 7007, provided to a video amplifier 7009 and integrator 7011 for integrating the baseband signal across the band of interest, and displayed at display 7013.

The output of the amplified signal, also referred to herein as a brightness temperature signal, may be interfaced to a laptop computer or smaller computer such as a personal hand-held or worn computer. In some embodiments, such a computer can include a display for displaying the voltage reading which is converted to a temperature. In addition, if radiation is emitted in certain pre-determined spectra, silicon dioxide or nitrogen dioxide, ammonia, water, carbon monoxide or other detection spectra may be identified in conventional manner, especially if present in substantial quantity. Such information can also be conveyed to first responders so that they can identify the nature of the burning materials and formulate the most effective plan for fighting the fire.

Figure 8:
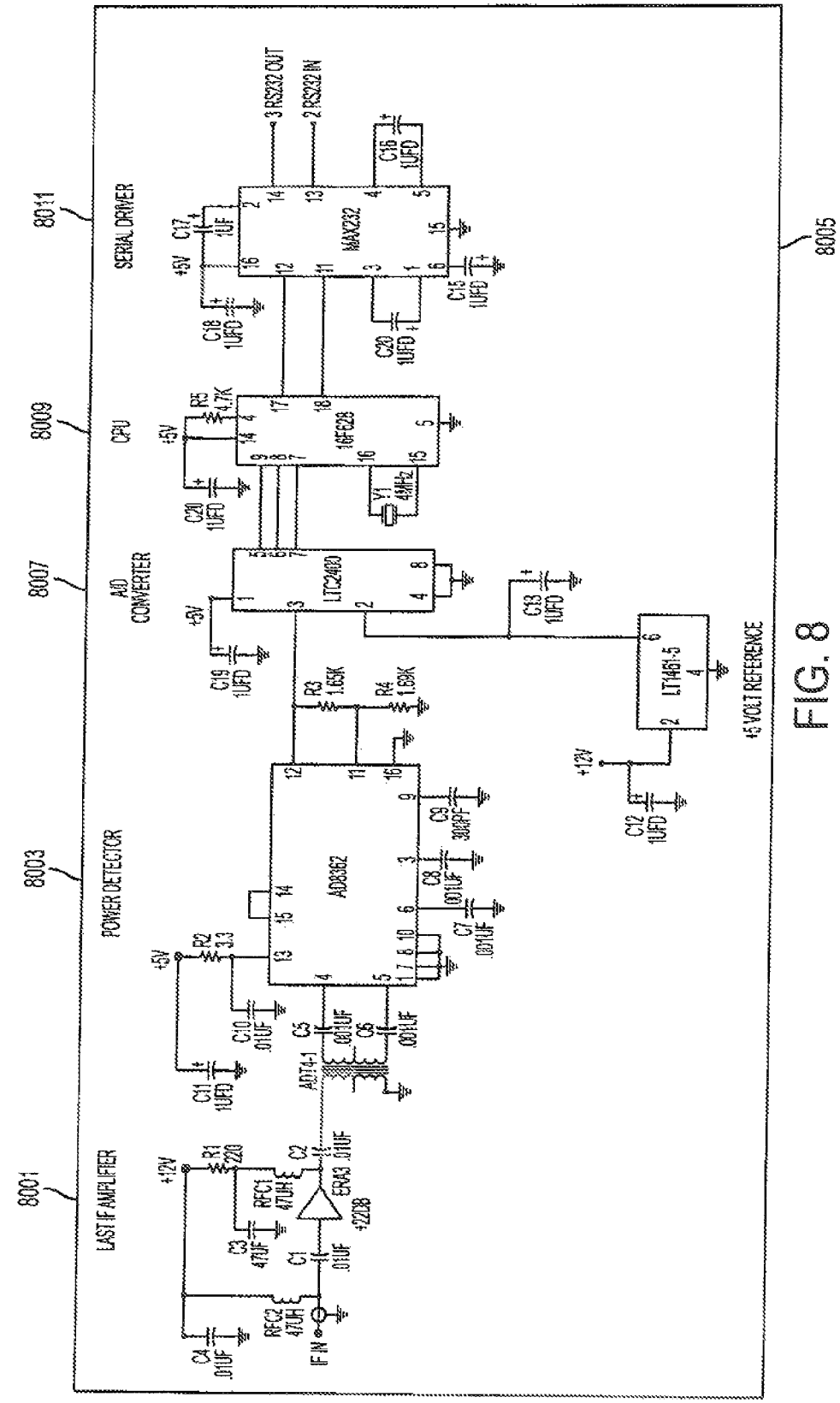
FIG. 8 is a schematic of an exemplary microwave heterodyne receiver which can be used in an individual antenna array such as the array shown in FIG. 2.

FIG. 8 provides a schematic of an electric circuit that can be used with a superheterodyne microwave receiver in accordance with one or more aspects described herein. As shown in FIG. 8, an intermediate frequency (IF) amplifier 8001 may be tuned for the receive frequencies of one antenna array and may match impedances for optimum transmission of data regarding passively defected temperatures (voltages). The output of such an IF amplifier 8001 can be fed via a transformer (which can perform impedance matching, isolation and other functions) to a detector 8003 such as a 50 Hz to 2.7 GHz analog detector circuit such as Analog Device AD 8362 circuit 330, which may be likewise tuned to a specific frequency or frequency range. Its output in turn can be provided to circuitry 8005 which includes a reference source voltage, for example, an LT1461-5 circuit 340 for providing a reference voltage of five volts for use at a LTC 2400 analog to digital converter 8007. The digital output of A/D converter 8007 can be provided to a CPU 8009 for conversion into, for example, ASCII for data entry into a signal processing unit computer 1005 and memory 1013 shown in FIG. 1. The depicted CPU is one manufactured and known as a PIC16F628 microcontroller but any suitable CPU can be used. The output of CPU 8009 can be provided to a conventional serial driver 8011 (for example, a 232 IC) for serial input to a signal processor/memory 1005/1013. In this manner, the output may be temperature compensated (via the Dicke switch) for a reference input and then fed to a central processing unit for analysis and, for example, display. Such a circuit may provide one input of many to signal processor 1005 shown in FIG. 1.

FIGS. 9-18 depict various aspects of testing of a passive microwave receiver apparatus by the inventors hereof. As shown in FIGS. 9-12 and 14, testing was performed using a small (approximately 19-inch) parabolic dish antenna, but it should be noted that such a parabolic antenna is only one or many antenna types that can be used in accordance with aspects described herein, and that other antenna configurations such as flat arrays, horn type arrays, point antennas, or directional antennas such as cellular telecommunication pole antenna arrays can be used.

Figure 9:
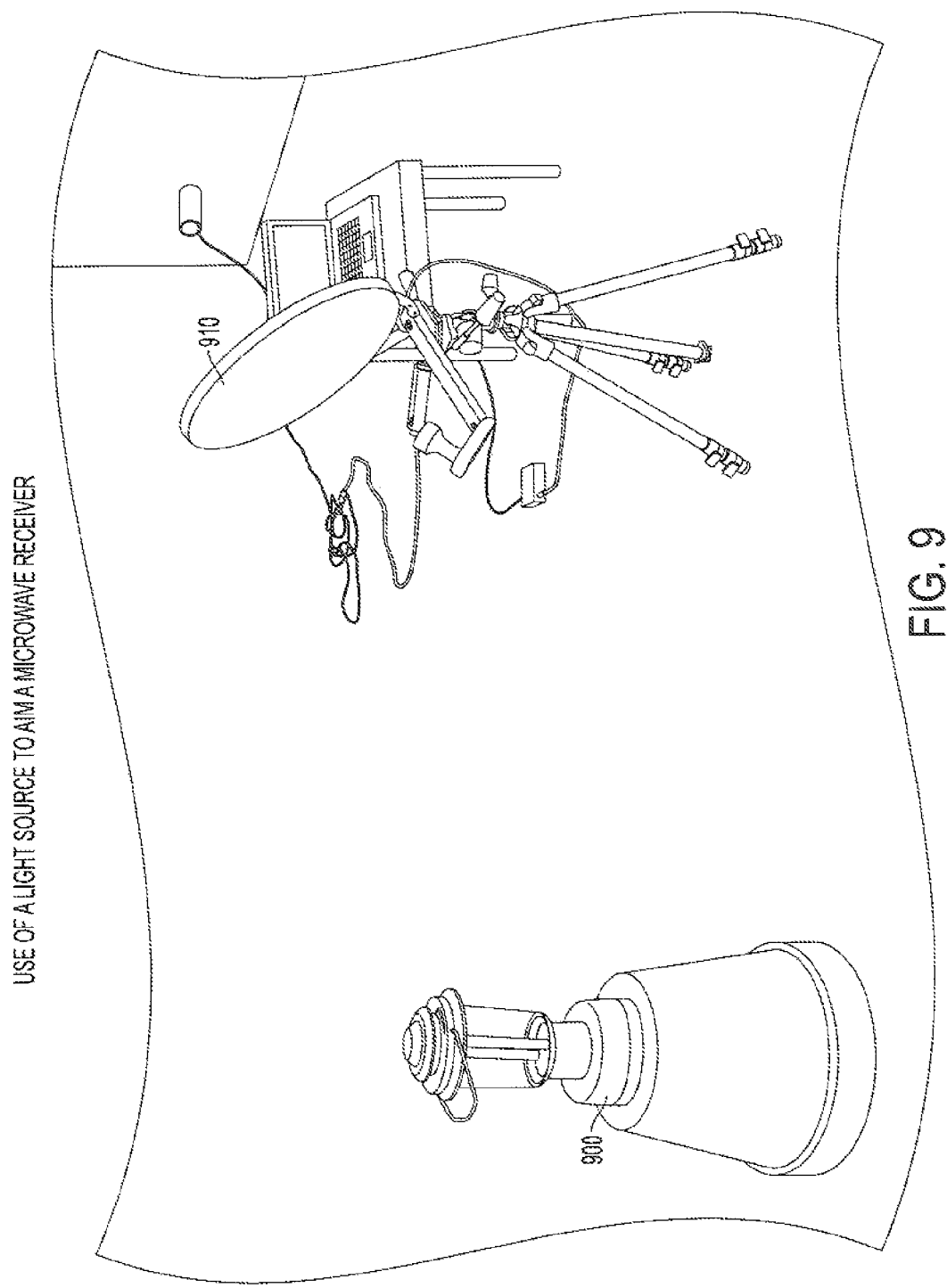
FIG. 9 is a drawing depicting use of a light source to aim a microwave receiver in accordance with one or more aspects onto a location of a test fire during experimental testing described herein.

FIG. 9 is a photograph depicting the use of a light source 900, here a lantern, by one of the inventors hereof to aim a microwave receiver 910 onto the location of the test fires. The light source 900, while emitting light in the visible part of the electromagnetic spectrum, also emits microwave radiation which can be detected by the parabolic antenna shown in the photograph. In the present photograph, a two-bulb portable battery-powered fluorescent lamp was used, but in alternative embodiments, other light sources, for example, a laser light source, can be used to direct an antenna to a region of interest for more accurate long-range out-of-doors environments.

Figure 10:
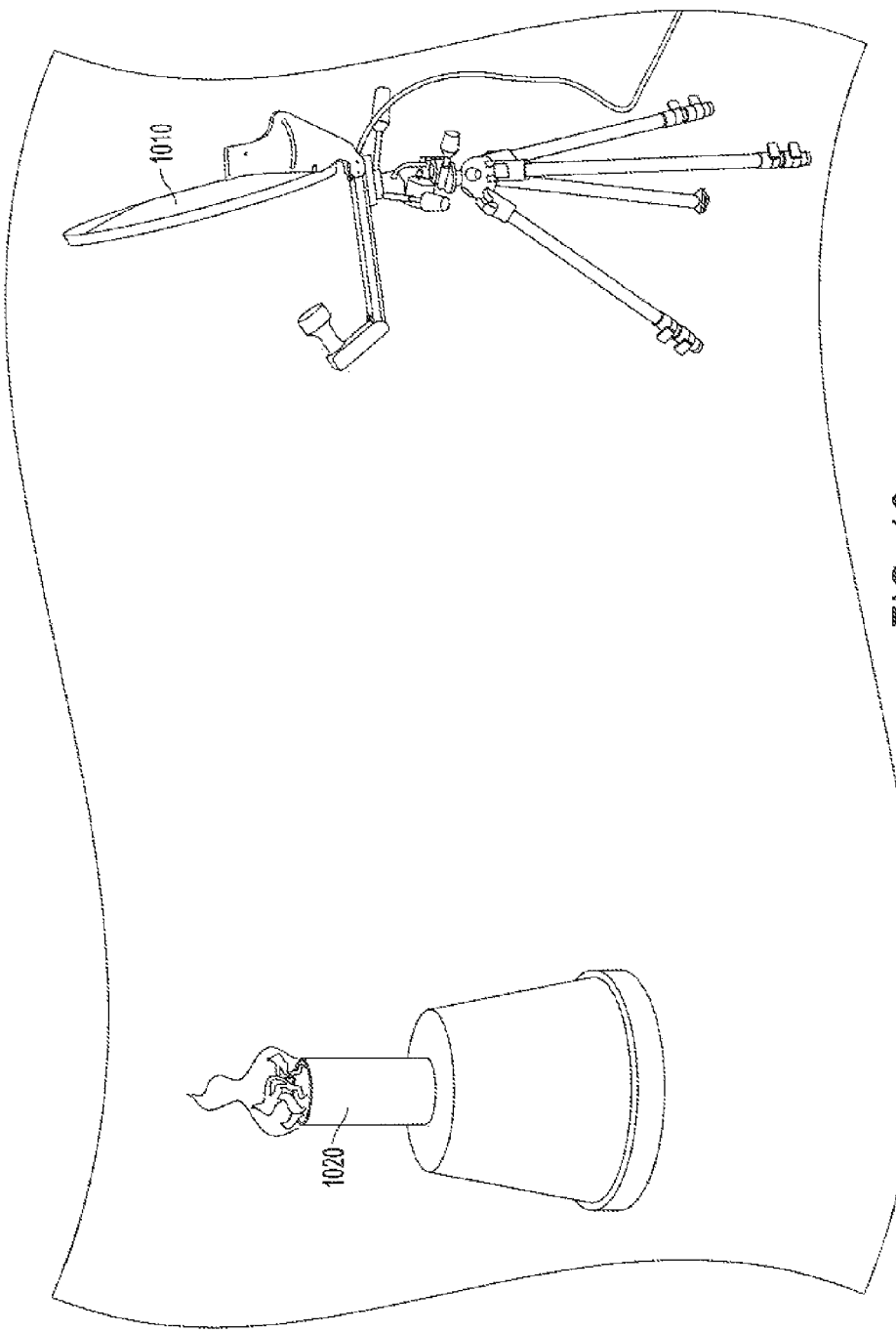
FIG. 10 is a drawing depicting use of a microwave receiver according to one or more aspects herein with a flaming test fire comprising burning shredded paper in an enclosed space.
Figure 11:
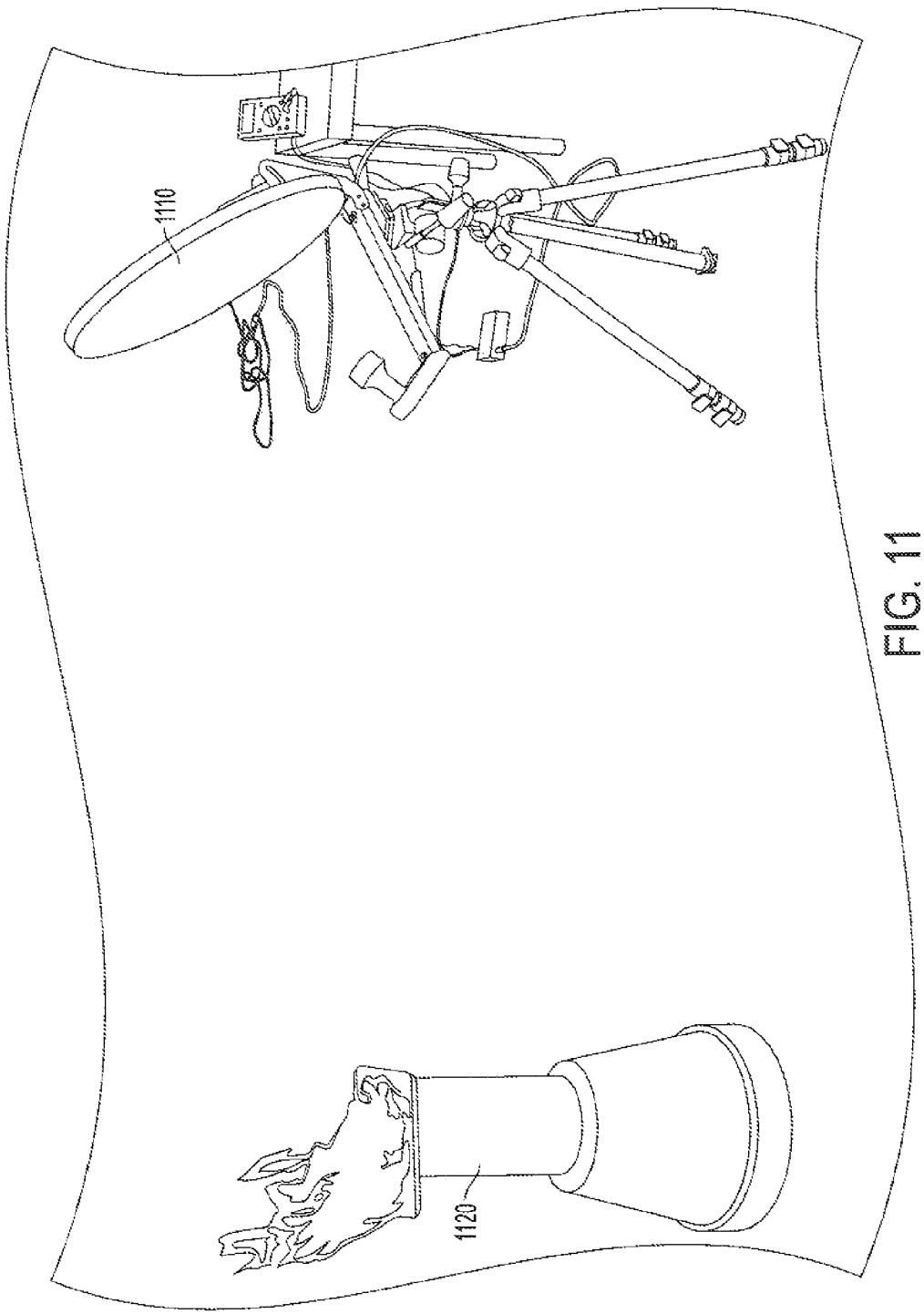
FIG. 11 is a drawing depicting use of a microwave receiver according to one or more aspects herein with a test fire comprising burning Isopropanol on a pan.
Figure 12:
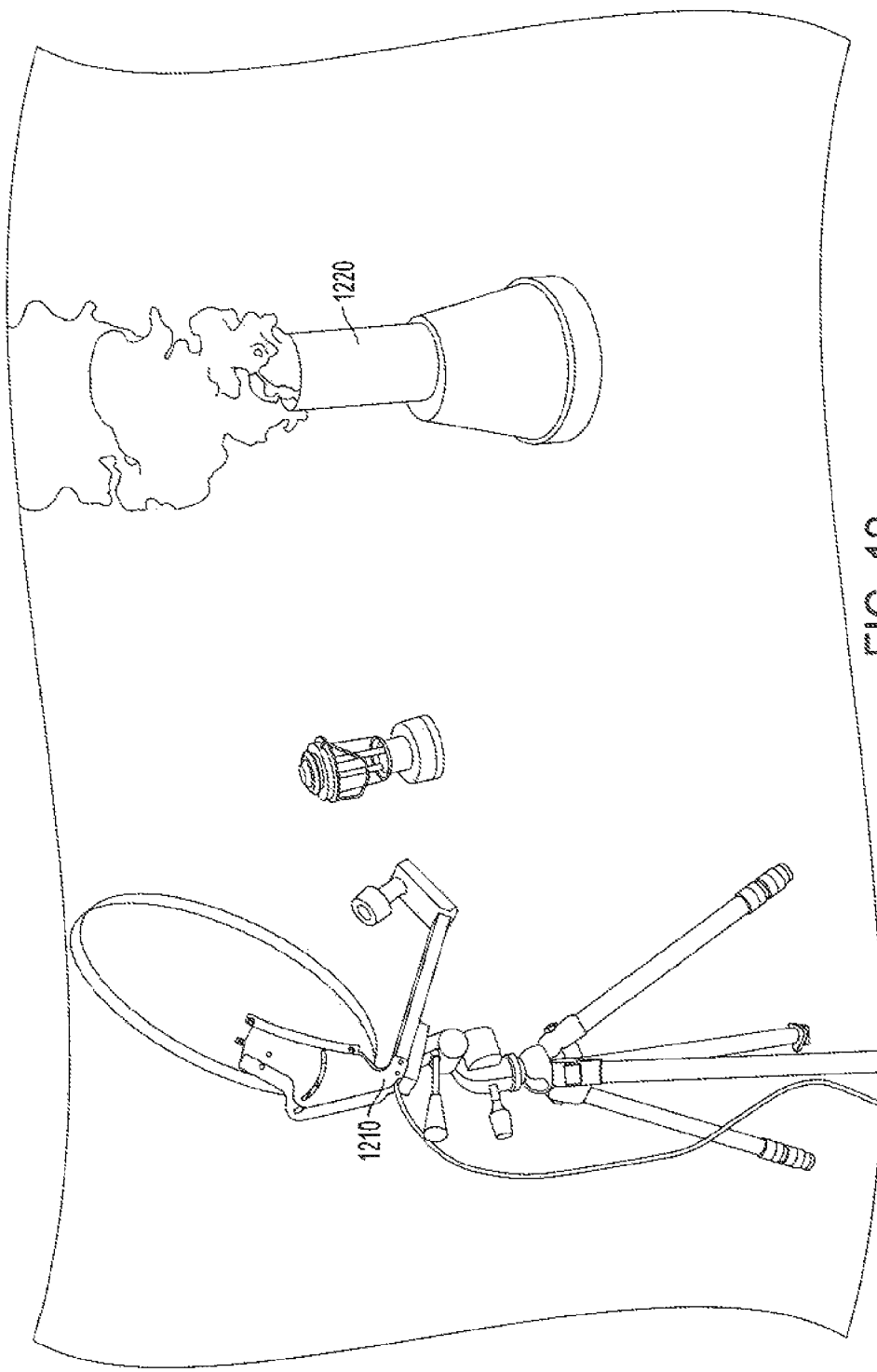
FIG. 12 is a drawing depicting use of a microwave receiver according to one or more aspects herein with a smoldering test fire comprising burning shredded paper in an enclosed space.

FIG. 10 is a photograph depicting use of a microwave receiver 1010 to detect a flaming fire comprising burning shredded paper in a confined space 1020, as would occur in a typical trash can fire. FIG. 11 is a photograph depicting use of a microwave receiver 1110 to detect a flaming fire comprising isopropanol burning in a pan 1120, as might occur in a chemical fire. FIG. 12 is a photograph depicting use of a microwave receiver 1210 to detect a smoldering, i.e., non-flaming, fire 1220 comprising burning shredded paper, as might occur in a trash can fire before full ignition occurs.

Both the burning and smoldering shredded paper were shown to be easily detected due to increased amounts of blackbody radiation produced by these fires. However, the flaming pan fire, since it generates less smoke and less amounts of blackbody radiation, would have been more easily discovered using conventional rate-of-rise temperature and/or flame detectors.

Figure 13:
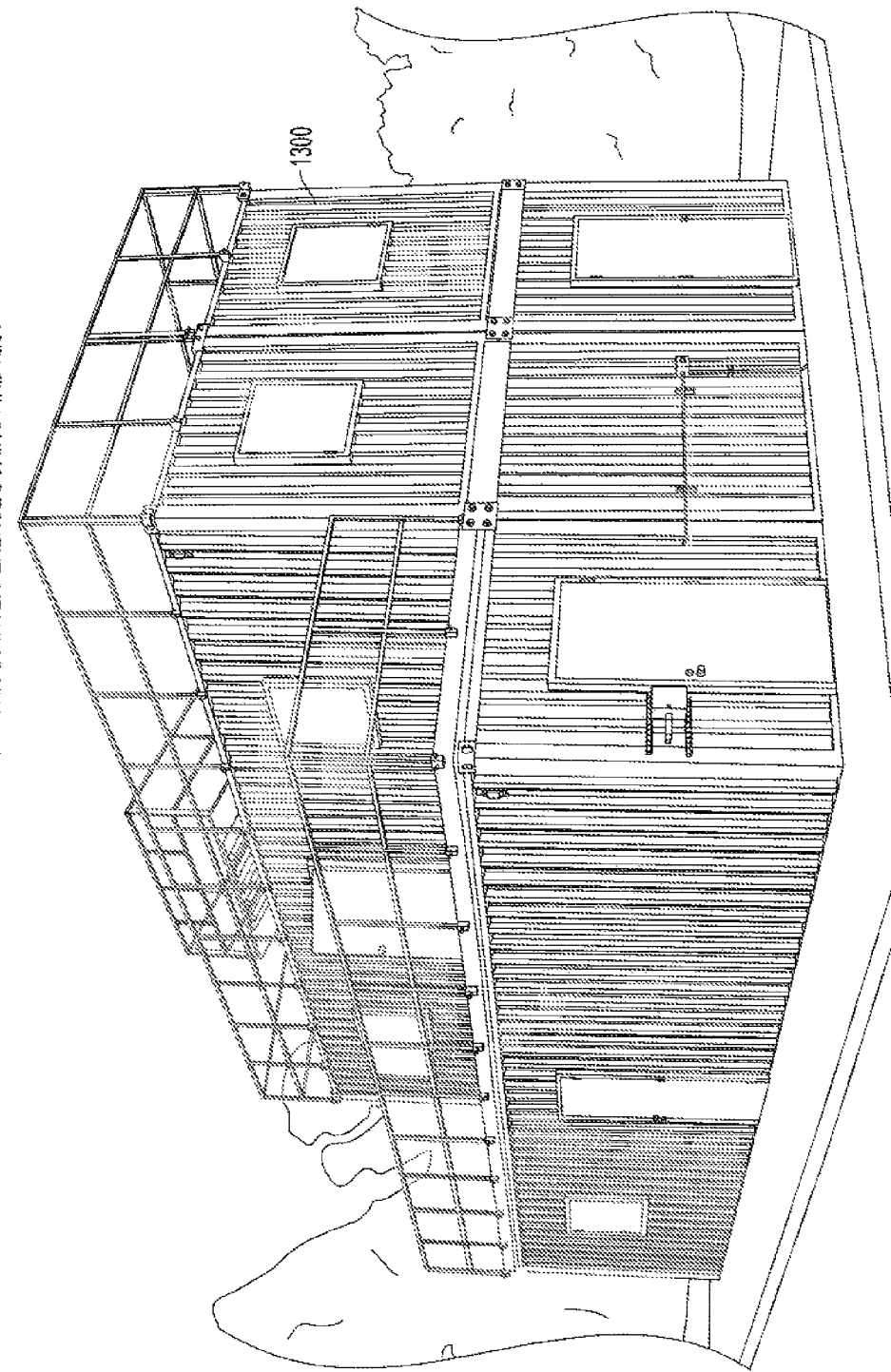
FIG. 13 is a drawing of a shielded steel building used during tests of a passive microwave fire and instruction detection apparatus in accordance with one or more aspects described herein.
Figure 14:
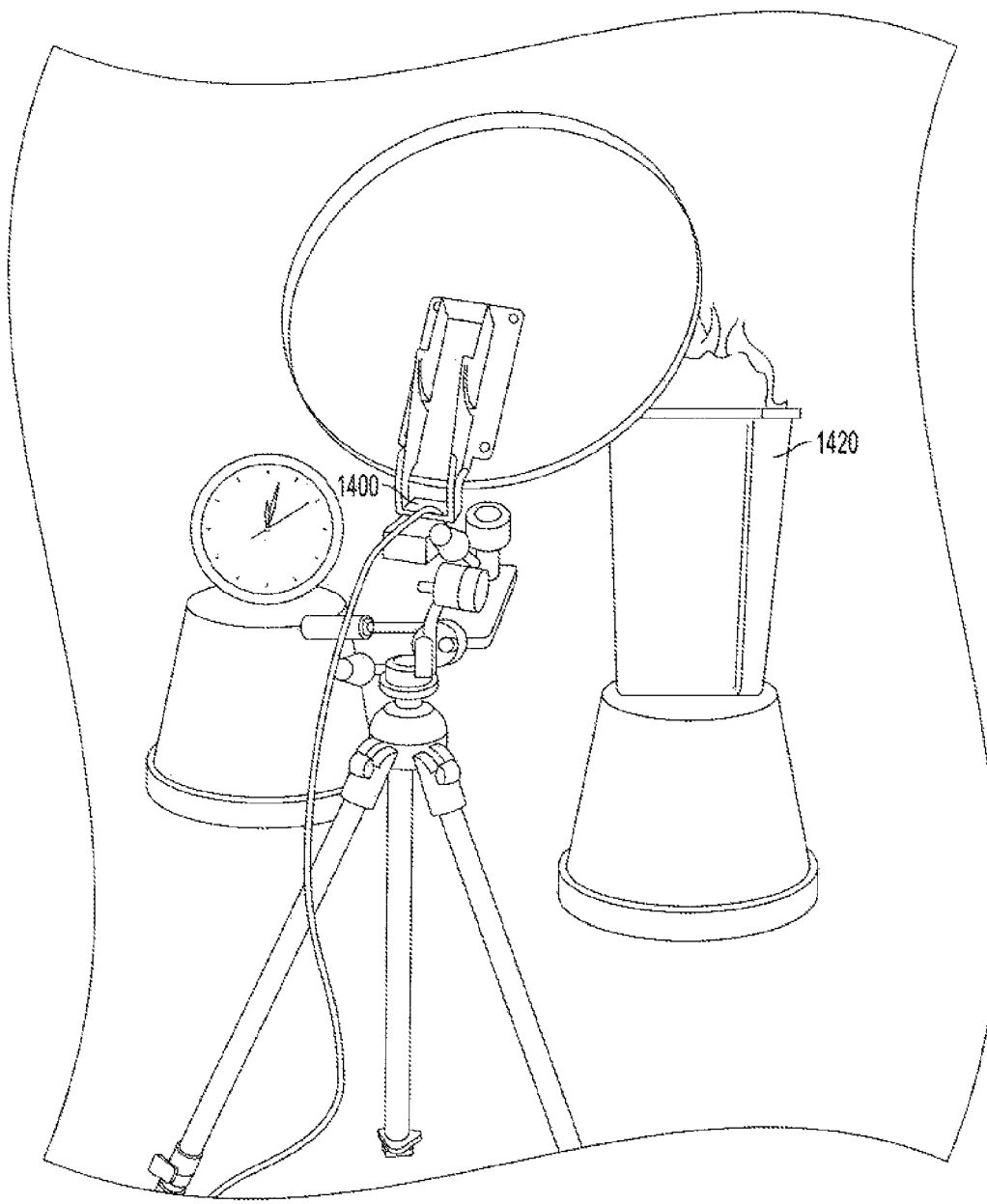
FIG. 14 is a drawing of a fire test conducted during ignition of a fire within the shielded steel building shown in FIG. 15.
Figure 15:
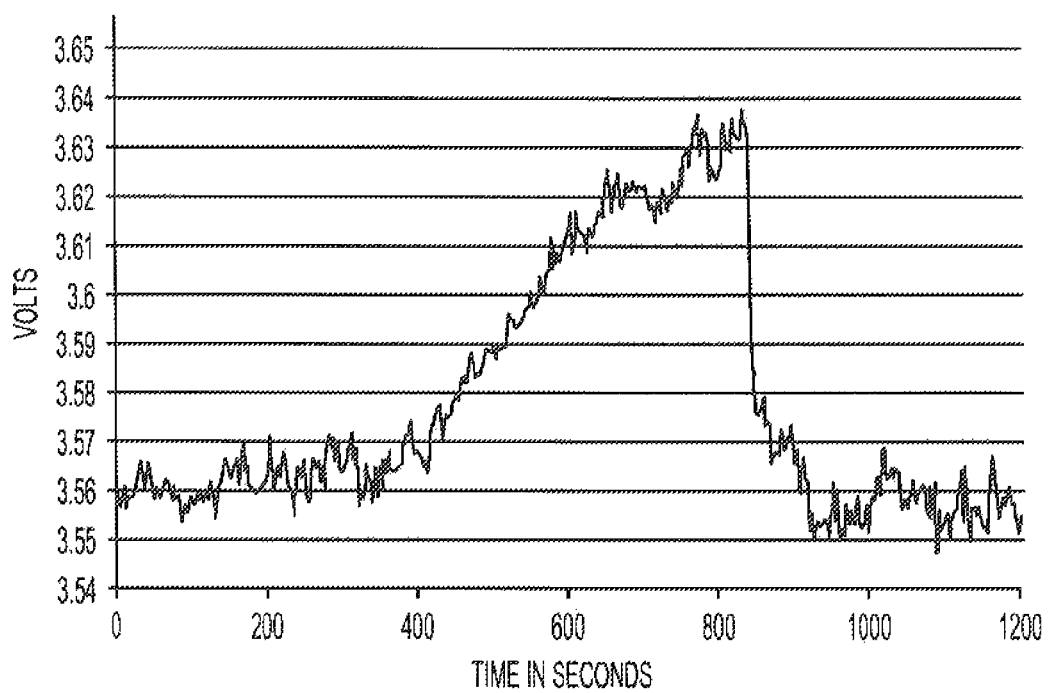
FIG. 15 depicts an exemplary set of voltage readings output from the fire test conducted within the shielded steel building shown in FIG. 13.

Other testing was performed in a shielded steel building 1300 as shown in FIGS. 13 and 14. As noted above, microwave radiation does not penetrate metal walls and so the building 1300 acted, in essence, as a "Faraday cage" blocking out any external extraneous electric fields or electromagnetic radiation. It thus could be ensured that any microwave radiation detected by the inventors during their tests came from the fire and not from any sources outside the building 1300. As shown in FIG. 14, a test fire 1420 was ignited and the antenna 1410 set up to monitor the fire during the ignition, growth, steady state, and decay stages. A graph of the voltage readings from this test fire 1420 is shown in FIG. 15. The voltage readings indicate and track a steady increase of temperatures until its peak after approximately 800 seconds, when the fire 1420 was then extinguished.

Figure 16:
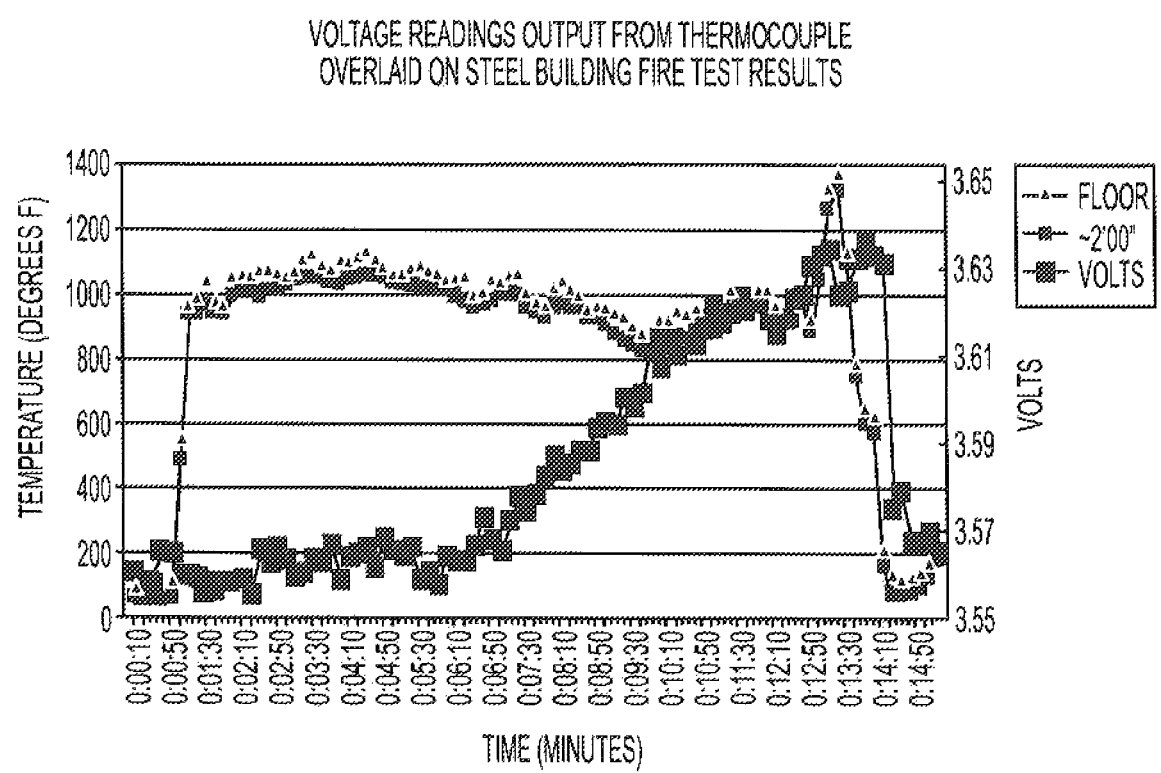
FIG. 16 depicts time-varying thermocouple temperature readings at approximately 2 feet (0.61 meters) above the floor level overlaid with the voltage output readings from the fire test conducted within the shielded steel building shown in FIG. 13.

During the same testing as performed in a shielded steel building 1300 as shown in FIGS. 13 and 14, thermocouple temperature data was also recorded at the floor, ceiling, and directly above the burning object at approximately 2 feet (0.61 meters) above the floor. This temperature data is shown in FIG. 16 as an overlay on the data previously shown voltage data in FIG. 15. Note that this FIG. 16 shows a sharp increase in temperature after ignition, leveling off at approximately 1000 degrees Fahrenheit (538 degrees Celsius), and quickly dropping after extinguishment of the fire after approximately 800 seconds.

Figure 17:
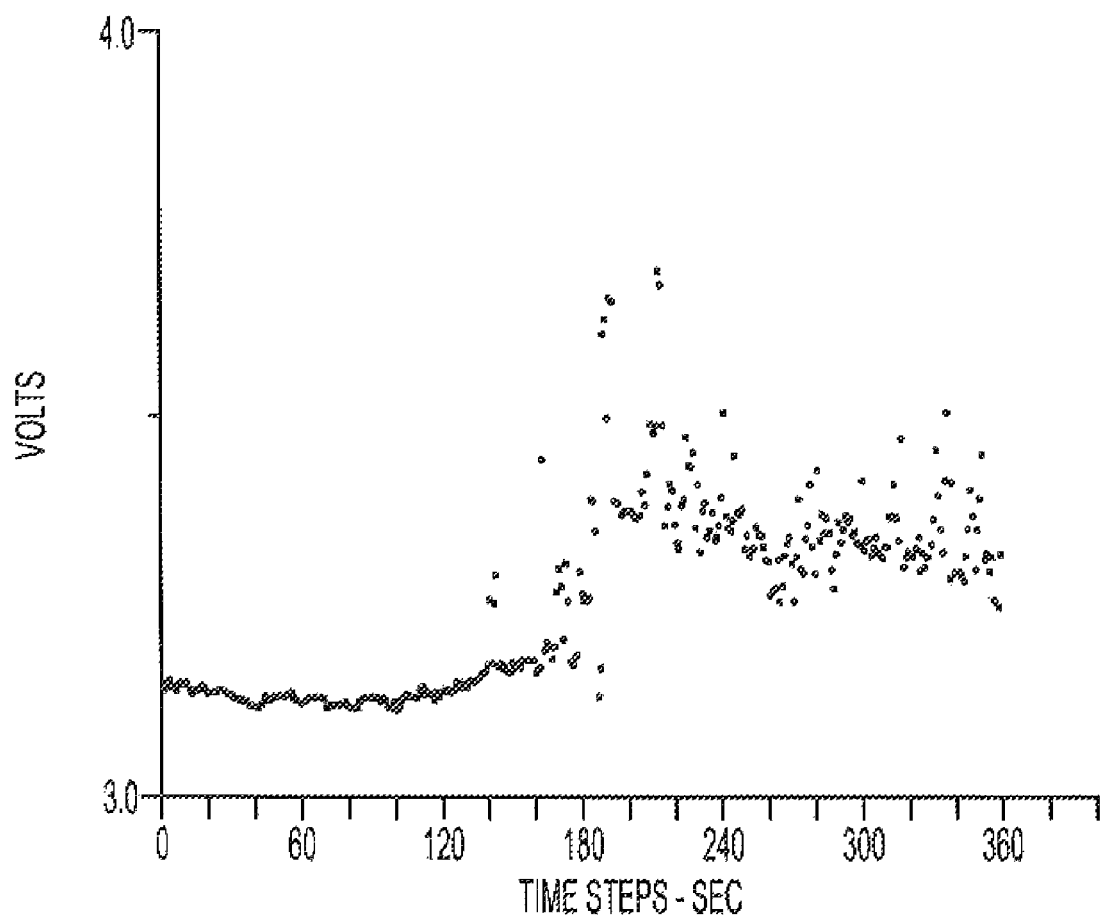
FIG. 17 depicts an exemplary set of voltage readings output from an intrusion detector due to the presence of an approaching overhead aircraft in accordance with one or more aspects described herein.

Further experimentation by the inventors demonstrates the use of passive microwave radiation detection in the field of intrusion detection. Testing by the inventors showed that approaching overhead aircraft could be detected, either because it provided a reflective interference easily detected by the apparatus or because it emitted microwave (radar) energy that could be detected as a change in voltage. For example, the scatter plot in FIG. 17 shows a positive scattered pattern of voltage readings that occurred when an aircraft was recognized over the horizon and flew over the test site at the time the readings in FIG. 17 were being made. Since an application of microwave fire or intrusion detection may be subject to false alarms by spurious accidental or intentional jamming signals on or surrounding the operational frequency, anomalies with known characteristics may be stored in central processing unit memory (FIG. 1; 1013) and subtracted or filtered from recorded measurement. Alternatively, the use of protected passive radio astronomy frequencies may ensure that few false alarms are triggered without having to filter anomalous radiation from active sources.

Figure 18:
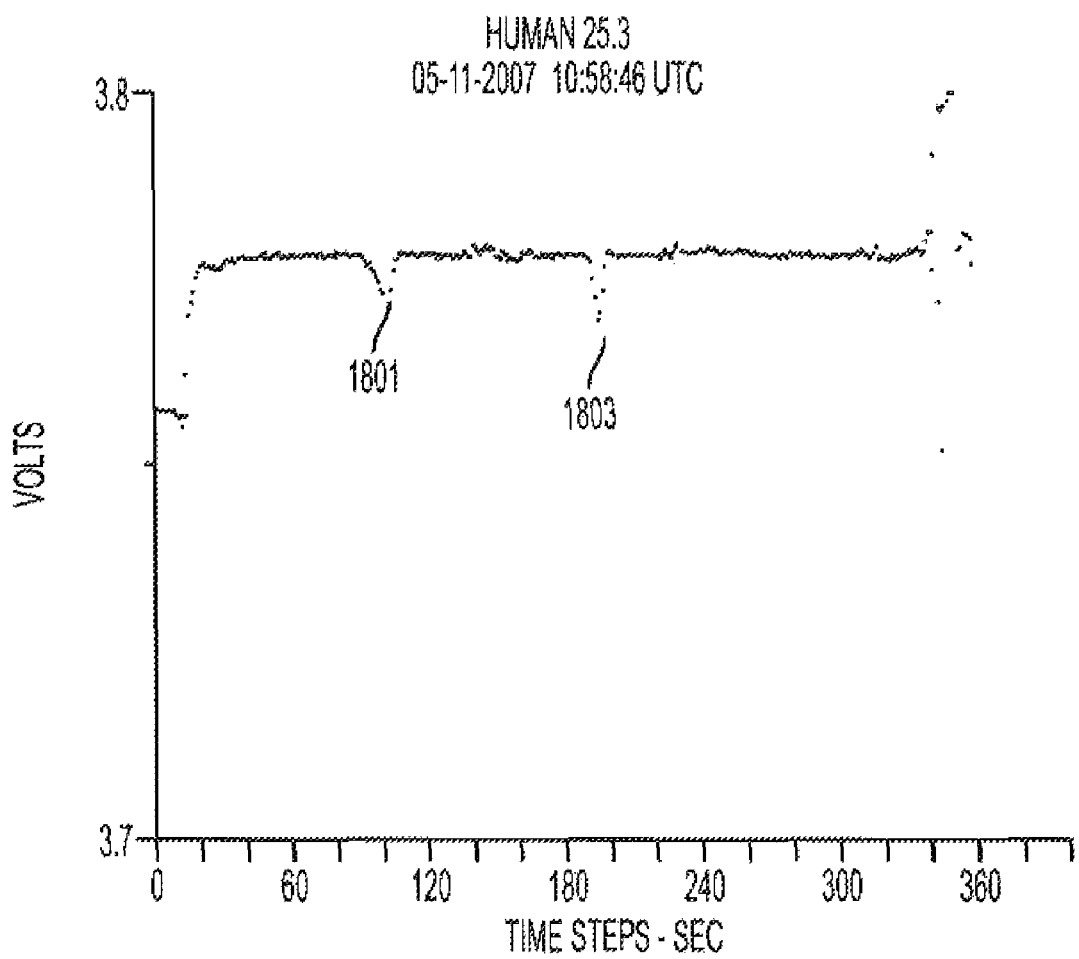
FIG. 18 depicts another set of voltage readings output from an intrusion detector due to the presence of a human at 25 and 50 feet in accordance with one or more aspects described herein.

Similarly, testing by the inventors showed the usefulness of a microwave detection apparatus as an intrusion detector. In particular, as shown in FIG. 18, a human may be detected at 15 meters (50 feet) from an array of antenna elements pointed in their direction. As shown in FIG. 18, a voltage drop occurred when a human being passed within range of the directional microwave receiver. Negative voltage 1801 represents a human at a relatively close distance to the detection apparatus while negative voltage 1803 represents a person farther away. The same sized person was detected at both points. Consequently, a person may be ranged by their size at signal processing apparatus 1005 and triangulation or other conventional methods used to precisely locate such a person. It is to be noted that a human may be defected as a negative voltage reading when compared to a reference voltage reading and so may be distinguishable from a fire which is detected by a positive voltage reading when compared with a reference voltage. Depending on the circumstances, such a detected person may be an intruder or a fire victim, and consequently, an embodiment of a passive microwave detection system may have utility for both intrusion detection and fire detection.

Thus, it can be seen that passive detection of microwave radiation from a fire or other heat source such as a human, animal, airplane, or automobile, can be used to provide fire and intrusion detection. A system of passive microwave detectors in accordance with aspects herein can be used to monitor and protect property. Passive microwave detectors can enable first responders to better identify and fight fires and to locate and save the lives of persons trapped in a fire.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein.

For example, it should be noted that other frequencies within the microwave range between 300 MHz and 300 GHz, other combinations of frequencies, and other variations in configuration and protocol are within the scope of the present disclosure.

In addition, some embodiments of a passive microwave fire and intrusion detection apparatus may incorporate other conventional detectors operating outside the microwave region, such as smoke detectors and temperature rise detectors and conventional intrusion detectors. Such embodiments are also contemplated to be within the scope and spirit of the present disclosure.

What is claimed is:

1. A method for detecting an intruder of predetermined size using passive reception of electromagnetic radiation, comprising:

passively receiving a first electromagnetic radiation signal at a first receiver, said first receiver including a first directional antenna at a first location, a signal value at a first frequency of said first passively received electromagnetic radiation signal being indicative of a temperature of a source of said first electromagnetic radiation signal;

passively receiving a second electromagnetic radiation signal at a second receiver, said second receiver including a second directional antenna at a second location different from the first location, a signal value at a second frequency of said second passively received electromagnetic radiation signal being indicative of a temperature of a source of said second passively received electromagnetic radiation signal, wherein said first frequency of said first passively received electromagnetic radiation signal and said second frequency of said second passively received electromagnetic radiation signal are within and are not outside a range of frequencies protected from active electromagnetic radiation signal transmission in a geographic area encompassing said first and second antenna locations; and comparing the signal value of said first frequency with the signal value of said second frequency using a signal processor to determine a distance of the intruder of the predetermined size from one of said first antenna and said second antenna.

2. The method according to claim 1, wherein said first frequency is within a protected range of frequencies between 21.850 and 21.870 MHz, providing a 20 KHz wide band and said second frequency is within a protected range of frequencies between 1.400 to 1.427 GHz, providing a 27 MHz band.

3. The method according to claim 1, wherein said first frequency is within a protected range of frequencies between 1.400 and 1.427 GHz, providing a 27 MHz wide band and said second frequency is within a protected range of frequencies between 2.690 to 2.700 GHz, providing a 10 MHz band.

4. The method according to claim 1, wherein said first and second frequencies are different frequencies within the protected range of frequencies between 1.400 and 1.427 GHz.

5. The method according to claim 1, wherein the distance of a the intruder from one of the first and second antenna locations can be determined by triangulation.

6. The method according to claim 1, wherein said intruder comprises a living being and a presence of a living being can be determined if the resulting voltage signal is negative.

7. The method according to claim 6, wherein a value of said negative resulting voltage signal distinguishes a living being.

8. The method according to claim 1, wherein at least one of said first and second receivers is configured to passively receive frequencies in a range which is one of 21.850 and 21.870 MHz, 1.400 to 1.427 GHz, 2.690 to 2.700 GHz, 10.680 to 10.700 GHz, 15.350 to 15.400 GHz, and 23.600 to 24.000 GHz.

9. The method according to claim 1, said first receiver compensating for a change in temperature of said source of said first electromagnetic radiation signal.

10. The method of claim 1, wherein at least one electromagnetic radiation signal characteristic of a field of view is stored in a memory of said signal processor, said stored electromagnetic radiation signal being subtracted from a passively received microwave radiation signal to determine an intrusion into said field of view.

11. The method of claim 1, further comprising transmitting data representing a location of at least one of said first directional antenna and said second directional antenna to said signal processor.

12. A system for passive electromagnetic radiation signal detection of at least one of a fire and an intruder, comprising:

a first receiver configured to passively receive a first electromagnetic radiation signal from a first source, a first frequency of said first passively received electromagnetic radiation signal being indicative of a temperature of said first source;

at least one second receiver configured to passively receive a second electromagnetic radiation signal from a second source, a second frequency of said second electromagnetic radiation signal being indicative of a temperature of a source of said second electromagnetic radiation, wherein said first frequency of said first passively received electromagnetic radiation signal and said second frequency of said second passively received electromagnetic radiation signal are within and not outside a range of frequencies protected from active electromagnetic radiation transmission in a geographic area encompassing a location of said first and second receivers;

a signal processor, said signal processor being configured to receive said first and second electromagnetic radiation signals from said first and second receivers and being further configured to convert said first and second electromagnetic radiation signals to first and second voltages, respectively, said signal processor further being configured to subtract said second voltage signal from said first voltage signal to obtain a resulting voltage signal;

wherein a presence of one of a fire and a living being can be determined depending on a polarity of said resulting voltage signal.

13. The system according to claim 12, wherein at least one of said first and second receivers comprises one of a point antenna, a flat antenna array, a parabolic antenna, a horn antenna, and a directional antenna array.

14. The system according to claim 12, wherein at least one of said first and second receivers is configured to receive frequencies in a range which is one of 21.850 and 21.870 MHz, 1.400 to 1.427 GHz, 2.690 to 2.700 GHz, 10.680 to 10.700 GHz, 15.350 to 15.400 GHz, and 23.600 to 24.000 GHz.

15. The system according to claim 12, wherein said first and second receivers are configured to be placed in spaced-apart locations in an enclosed space, at least one of said first and second receivers being directional and providing a main lobe from a wall of said enclosed space to at least a center of said enclosed space.

16. The system according to claim 12, wherein said signal processor includes a memory, and further wherein at least one microwave radiation signal characteristic of a field of view is stored in said memory, said stored microwave radiation signal being subtracted from a received microwave signal to identify at least one of a fire and an intrusion into said field of view.

17. The system according to claim 12, further comprising third, fourth, and fifth receivers, wherein each of said second, third, fourth, and fifth receivers is placed in a corner of said enclosed space and said first receiver is placed in a central location in said enclosed space.

18. A method for detecting an intruder of predetermined size using passive reception of microwave radiation, comprising:

passively receiving a microwave radiation signal at a receiver, said receiver including at least a first directional antenna and a second directional antenna at different locations, a frequency of said passively received microwave radiation signal being indicative of a temperature of a source of said microwave radiation, wherein said frequency of said passively received microwave radiation signal is within and not outside a range of frequencies protected from active microwave radiation transmission in a geographic area encompassing a location of said receiver; and detecting the distance of the intruder from one of the first antenna location and the second antenna location by triangulation using a signal processor, wherein said source of said microwave radiation is the intruder.

19. The method according to claim 18, further comprising:

transmitting said microwave radiation signal to said signal processor, said passively received microwave radiation signal being converted to a voltage signal for transmission;

said presence of said intruder being determined based on a polarity and magnitude of said voltage signal.

20. The method according to claim 18, wherein said receiver is configured to receive a microwave radiation signal in a range which is one of 1.400 to 1.427 GHz, 2.690 to 2.700 GHz, 10.680 to 10.700 GHz, 15.350 to 15.400 GHz, and 23.600 to 24.000 GHz.

21. The method according to claim 18, wherein at least one microwave radiation signal for a predetermined field of view of said at least one antenna is stored in a memory of said signal processor, said stored microwave radiation signal being subtracted from said passively received microwave radiation signal to determine a presence of at least one of a fire and an intruder in said predetermined field of view.

22. An apparatus for passive microwave detection of an intruder of predetermined size, comprising:

a receiver configured to passively receive a microwave radiation signal from a first source, a frequency of said passively received microwave radiation signal being indicative of a temperature of said first source, said frequency of said passively received microwave radiation signal being within and not outside a range of frequencies protected from active microwave transmission in a geographic area encompassing a location of said receiver;

a directional antenna configured to passively receive the microwave radiation signal from a predetermined source, the apparatus compensating for changes in temperature of the predetermined source; and a signal processor configured to compare said passively received microwave signal to said microwave signal from said predetermined source to provide a resulting voltage signal;

wherein a presence of the intruder of predetermined size and at different distances from said directional antenna is determined from a polarity and magnitude of said resulting voltage signal.

23. The apparatus of claim 22, wherein said receiver and antenna are configured to be a hand-held device.

24. The apparatus of claim 22, wherein said receiver and antenna are configured to be worn by a user and said predetermined source comprises a part of a human body.

* * * * *